United States Patent [19]

Nakao et al.

[11] Patent Number: 5,781,266
[45] Date of Patent: Jul. 14, 1998

[54] FERROELECTRIC LIQUID CRYSTAL DISPLAY DEVICE AND METHOD FOR PRODUCING THE SAME

[75] Inventors: Kenji Nakao, Kadoma; Hiroyuki Ohnishi, Takarazuka; Naohide Wakita, Osaka; Kazuya Nagao, Kawagoe; Naomi Takada, Kyoto, all of Japan

[73] Assignees: Matsushita Electric Industrial Co., Ltd., Osaka, Japan; Hoechst Aktiengesellschaft, Frankfurt am Main, Germany

[21] Appl. No.: 312,410

[22] Filed: Sep. 26, 1994

[30] Foreign Application Priority Data

Sep. 27, 1993 [JP] Japan .................................. 5-239900
Sep. 27, 1993 [JP] Japan .................................. 5-240086

[51] Int. Cl.⁶ .................................................. G02F 1/141
[52] U.S. Cl. ........................... 349/172; 349/161; 349/188; 349/191
[58] Field of Search ............................ 359/56, 76, 90, 359/100; 349/161, 168, 172, 188, 191

[56] References Cited

U.S. PATENT DOCUMENTS

| | | | |
|---|---|---|---|
| 4,932,758 | 6/1990 | Hanyu et al. | 359/100 |
| 5,013,137 | 5/1991 | Tsuboyama et al. | 349/191 |
| 5,151,804 | 9/1992 | Verhulst et al. | 359/76 |
| 5,189,536 | 2/1993 | Hanyu et al. | 359/100 |
| 5,206,751 | 4/1993 | Escher et al. | 359/100 |
| 5,305,131 | 4/1994 | Terada et al. | 359/100 |
| 5,417,883 | 5/1995 | Epstein et al. | 359/100 |
| 5,458,804 | 10/1995 | Yamada et al. | 349/172 |
| 5,528,394 | 6/1996 | Yeoh et al. | 359/56 |
| 5,543,943 | 8/1996 | Hanyu et al. | 349/124 |
| 5,583,680 | 12/1996 | Nakamura et al. | 349/191 |

FOREIGN PATENT DOCUMENTS 62-161122 7/1987 Japan .
2259786 3/1993 United Kingdom .............. 349/128

OTHER PUBLICATIONS

K. Nagao et al., "Temperature Dependences of Effective Cone Angles of Surface-Stabilized Ferroelectric Liquid Crystal: Correlation with Layer Structure Changes Caused by Electrical Square Waves", *Japanese Journal of Applied Physics*, vol. 30, No. 7A, pp. L1189–L1191 (Jul. 1991).

K. Nagao et al., *Preprints of the 17th Symposium on Liquid Crystals*, pp. 386–387 (1991).

Escher et al "Surface Stabilized Ferroelectric Liquid Crystals a Promising Technology for High Resolution Displays", Feb. 1992.

SPIE –vol. 1665, Liquid Crystal Materials, Devices, and Applications pp. 90–101, No Date.

Y. Sato et al "High Quality Ferroelectric Liquid Crystal Display with Quasi-Bookshelf Layer Structure" Japanese Journal of Applied Physics –vol.28, No. 3, Mar. 1989–pp. L483–L486 No Date.

*Primary Examiner*—William L. Sikes
*Assistant Examiner*—Tai V. Duong
*Attorney, Agent, or Firm*—Ratner & Prestia

[57] ABSTRACT

A ferroelectric liquid crystal display device of the present invention includes: a pair of substrates; a ferroelectric liquid crystal layer provided between the pair of substrates; and an electrode for applying a voltage to the ferroelectric liquid crystal layer, wherein the ferroelectric liquid crystal layer has bent smectic layers, and an effective bend angle $\theta L$ of the bent smectic layers satisfies the relationship: $\theta Leff > \theta L > 0°$ in a temperature range in which the ferroelectric liquid crystal display device is stored, where an effective bend angle of the smectic layers in a first state is $\theta Leff$, the first state being obtained by cooling the ferroelectric liquid crystal layer from a temperature higher than a phase transition temperature of a chiral smectic C phase—a smectic A phase to a temperature not higher than a phase transition temperature of the chiral smectic C phase—the smectic A phase.

22 Claims, 16 Drawing Sheets

FERROELECTRIC LIQUID CRYSTAL DISPLAY DEVICE AND METHOD FOR PRODUCING THE SAME

BACKGROUND OF THE INVENTION

1. Field of the Invention

The present invention relates to a ferroelectric liquid crystal display device and a method for producing the same. In particular, the present invention relates to a ferroelectric liquid crystal display device having outstanding display characteristics which change less with time.

2. Description of the Related Art

Liquid crystal molecules in a ferroelectric liquid crystal layer (surface stabilized ferroelectric liquid crystal: SSFLC) having a thickness as small as 2 μm takes two orientation states (bistable state). The switching between the two stable orientation states can be conducted by reversing the polarity of an electric field applied to the ferroelectric liquid crystal layer. The angle $2\theta$ between the orientation directions in a bistable state is determined by a tilt angle $\psi$ inherent in a ferroelectric liquid crystal material and a layer structure (a smectic layer structure) of the ferroelectric liquid crystal layer.

The phase sequence of ferroelectric liquid crystal has a non-ferroelectric phase (a smectic A phase, a chiral nematic phase, and an isotropic liquid phase) exhibiting no ferroelectricity on the higher temperature side of the ferroelectric phase (a chiral smectic C phase) exhibiting ferroelectricity. The state of ferroelectric liquid crystal immediately after being transitioned from the non-ferroelectric phase to the ferroelectric phase is assigned to be the first state. The layer structure of the ferroelectric liquid crystal layer in the first state and the orientation state of liquid crystal molecules therein will be described with reference to FIGS. 2A to 2C. The ferroelectric liquid crystal layer has a structure in which smectic layers are stacked in the direction parallel to the substrates. The ferroelectric liquid crystal layer in the first state has a layer bend structure called a Chevron structure, as shown in FIG. 2B. The liquid crystal molecules in the smectic layer are positioned on a cone defined by a tilt angle $\psi$ with respect to a normal line (represented by a broken line N in FIG. 2C) of the smectic layer. The liquid crystal molecules of SSFLC are likely to align in parallel with the substrates. Thus, the angle (referred to as $2\theta_{eff}$) between the two stable orientation directions of the liquid crystal molecules in the first state has a value smaller than twice the tilt angle $\psi$.

When a low frequency AC electric field is applied to a ferroelectric liquid crystal layer in the first state, the angle formed by the average orientation direction of bistable liquid crystal molecules becomes large. This state is assigned to be a second state. The layer structure of the ferroelectric liquid crystal layer in the second state and the orientation state of the liquid crystal molecules therein will be described with reference to FIGS. 3A to 3C. The ferroelectric liquid crystal layer in the second state has a layer structure called Bookshelf structure. In the Bookshelf structure, the smectic layers are almost perpendicular to the substrates. The liquid crystal molecules of SSFLC are likely to align in parallel with the substrates. Thus, the angle (referred to as $2\theta_{int}$) between the two stable orientation directions of the liquid crystal molecules in the second state has a value about twice the tilt angle $\psi$. Accordingly, $2\theta_{int}$ becomes larger than $2\theta_{eff}$.

A ferroelectric liquid crystal display device using the first state disclosed in U.S. Pat. No. 4,932,758 has a problem of low contrast because of small $2\theta_{eff}$.

A conventional ferroelectric liquid crystal display device using the second state disclosed in Japanese Laid-Open Patent Publication No. 62-2209 has a problem in that, in the case where the use environment temperature is increased, contrast is partially decreased in accordance with a pattern previously displayed. Although the decrease in contrast is very small, it is easily recognized by the user since the decrease in contrast is exhibited as a clear pattern.

Japanese Journal of Applied Physics, Vol. 30, No. 7A, July, 1991, pp. L1189–L1191 by K. Nagao et al. and Preprints of the 17th Symposium on liquid crystals, pp. 386–387 (1991) by K. Nagao et al. report the relationship between the temperature at which a low frequency AC electric field is applied to a ferroelectric liquid crystal layer and the $\theta_{int}$ in the resulting ferroelectric liquid crystal layer in the second state. According to this literature, the temperature dependence of $\theta_{int}$ is decreased at a temperature not higher than that of the electric field treatment. However, the ferroelectric liquid crystal layer is subjected to the electric field treatment at a temperature not lower than room temperature (i.e., 50° C.) and is then cooled to room temperature (initial state), zigzag defects appear therein. Furthermore, as a result of the experiment of the inventors of the present invention, the following was found: Even in the case where a satisfactory display is obtained in the ferroelectric liquid crystal layer in the initial state, the line-shaped regions having a threshold voltage different from that of the other regions are formed in the ferro-electric liquid crystal layer after the ferroelectric liquid crystal device has been driven for a long period of time.

SUMMARY OF THE INVENTION

The ferroelectric liquid crystal display device of this invention, comprises: a pair of substrates; a ferroelectric liquid crystal layer provided between the pair of substrates; and an electrode for applying a voltage to the ferroelectric liquid crystal layer, wherein the ferroelectric liquid crystal layer has bent smectic layers, and an effective bend angle $\theta L$ of the bent smectic layers satisfies the relationship: $\theta Leff > \theta L > 0°$ in a temperature range in which the ferroelectric liquid crystal display device is stored, where an effective bend angle of the smectic layers in a first state is $\theta Leff$, the first state being obtained by cooling the ferroelectric liquid crystal layer from a temperature higher than a phase transition temperature of a chiral smectic C phase—a smectic A phase to a temperature not higher than a phase transition temperature of the chiral smectic C phase—the smectic A phase.

In one embodiment of the present invention, the effective bend angle $\theta Leff$ of the smectic layers in the first state is not higher than 24°.

In another embodiment of the present invention, the effective bend angle $\theta L$ of the smectic layers is not lower than 1°.

In still another embodiment of the present invention, the effective bend angle $\theta L$ of the smectic layers is not higher than 15°.

In still another embodiment of the present invention, the ferroelectric liquid crystal layer contains a ferroelectric liquid crystal mixture having a spontaneous polarization charge in the range of 10 nC/cm$^2$ to 30 nC/cm$^2$.

In still another embodiment of the present invention, the ferroelectric liquid crystal layer contains a ferroelectric liquid crystal mixture having an amount of ions per unit area in the range of 20 nC/cm$^2$ to 5000 nC/cm$^2$ In still another embodiment of the present invention, the ferroelectric liquid crystal layer contains a ferroelectric liquid crystal mixture having a phase sequence of a chiral smectic C phase, a smectic A phase, a chiral nematic phase, and an isotropic liquid phase in the order of increasing temperatures, wherein the ferroelectric liquid crystal mixture satisfies the relationship:

$$0.97 \leq (T_{CA}+273)/(T_{AN}+273) \leq 0.995$$

where a phase transition temperature from the chiral smectic C phase to the smectic A phase is $T_{CA}$ in centigrade, and a phase transition temperature from the smectic A phase to the chiral nematic phase is $T_{AN}$ in centigrade.

In still another embodiment of the present invention, an upper limit of a temperature range in which the ferroelectric liquid crystal display device is stored is not lower than 60° C.

Alternatively, a ferroelectric liquid crystal display device of the present invention comprises: a pair of substrates; a ferroelectric liquid crystal layer provided between the pair of substrates; and an electrode for applying a voltage to the ferroelectric liquid crystal layer, wherein the ferroelectric liquid crystal layer is subjected to an electric field treatment for applying a low frequency AC electric field at a temperature exceeding room temperature, the ferroelectric liquid crystal layer has smectic layers, and layer thickness of each of the smectic layers at an upper limit of a temperature range in which the ferroelectric liquid crystal display device is stored is larger than any layer thickness of the smectic layers in a temperature range in which the ferroelectric liquid crystal display device is stored.

In one embodiment of the present invention a difference between the largest layer thickness and the smallest layer thickness of the smectic layers in a temperature range in which the ferroelectric liquid crystal display device is stored is 2 Å or less.

Alternatively, a ferroelectric liquid crystal display device of the present invention comprises: a pair of substrates; a ferroelectric liquid crystal layer provided between the pair of substrates; and an electrode for applying a voltage to the ferroelectric liquid crystal layer, wherein the ferroelectric liquid crystal layer is subjected to an electric field treatment for applying a low frequency AC electric field at a temperature exceeding room temperature, and the ferroelectric liquid crystal has two stable states in an molecular orientation direction and satisfies the following relationship:

$$2\theta int - 2\theta < 10°$$

where an angle between molecular orientation directions in the two stable states of the ferroelectric liquid crystal at room temperature is $2\theta$, and an angle between the molecular orientation directions in the two stable states of the ferroelectric liquid crystal immediately after being applied with a low frequency AC electric field at room temperature is $2\theta int$.

Alternatively, a ferroelectric liquid crystal display device of the present invention comprises: a pair of substrates; a ferroelectric liquid crystal layer provided between the pair of substrates; and an electrode for applying a voltage to the ferroelectric liquid crystal layer, wherein the ferroelectric liquid crystal layer is subjected to an electric field treatment for applying a low frequency AC electric field, the ferroelectric liquid crystal layer has smectic layers, and a difference between an effective bend angle of the smectic layers in an initial state and an effective bend angle of the smectic layers after a continuous driving for a predetermined period of time is in the range of 0° to 5°.

According to another aspect of the present invention, a ferroelectric liquid crystal display apparatus including: a pair of substrates; a ferroelectric liquid crystal layer provided between the pair of substrates; and an electrode for applying a voltage to the ferroelectric liquid crystal layer, the ferroelectric liquid crystal layer having bent smectic layers, comprises:

a ferroelectric liquid crystal display device in which an effective bend angle oL of the bent smectic layers satisfies the relationship: $\theta Leff > \theta L > 0°$ in a temperature range in which the ferroelectric liquid crystal display device is stored; where an effective bend angle of the smectic layers in a first state is $\theta Leff$, the first state being obtained by cooling the ferroelectric liquid crystal layer from a temperature higher than a phase transition temperature of a chiral smectic C phase—a smectic A phase to a temperature not higher than a phase transition temperature of the chiral smectic C phase—the smectic A phase;

heating means for heating the ferroelectric liquid crystal display device to a predetermined temperature; and electric field treatment means for applying a low frequency AC electric field to the ferroelectric liquid crystal layer at the predetermined temperature.

According to still another aspect of the present invention, a method for producing a ferroelectric liquid crystal display device including: a pair of substrates; a ferroelectric liquid crystal layer provided between the pair of substrates; and an electrode for applying a voltage to the ferroelectric liquid crystal layer, comprises the step of conducting an electric field treatment for applying a low frequency AC electric field to the ferroelectric liquid crystal layer at a temperature exceeding room temperature, wherein the ferroelectric liquid crystal layer has bent smectic layers, and an effective bend angle $\theta L$ of the bent smectic layers satisfies the relationship: $\theta Leff > \theta L > 0°$ in the temperature range in which the ferroelectric liquid crystal display device is stored, where an effective bend angle of the smectic layers in a first state is $\theta Leff$, the first state being obtained by cooling the ferroelectric liquid crystal layer from a temperature higher than a phase transition temperature of a chiral smectic C phase—a smectic A phase to a temperature not higher than a phase transition temperature of the chiral smectic C phase—the smectic A phase.

In one embodiment of the present invention, a temperature at which the electric field treatment is conducted is 60° C. or higher.

In another embodiment of the present invention, a chiral smectic C phase—smectic A phase transition temperature of a ferroelectric liquid crystal mixture contained in the ferroelectric liquid crystal layer is 5° C. higher than an upper limit of a temperature range in which the ferroelectric liquid crystal display device is stored.

In still another embodiment of the present invention, the upper limit of the temperature range in which the ferroelectric liquid crystal display device is stored is at least 5° C. lower than a phase transition temperature from a chiral smectic C phase to a smectic A phase of a ferroelectric liquid crystal display mixture contained in the ferroelectric liquid crystal layer.

In still another embodiment of the present invention, an electric field strength of the low frequency AC electric field used during the electric field treatment is in the range of 10 V/µm to 35 V/pm.

In still another embodiment of the present invention, a frequency of the low frequency AC electric field used during the electric field treatment is in a range from 5 Hz to lower than 1 KHz.

Thus, the invention described herein makes possible at least one of the advantages of (1) providing a ferroelectric liquid crystal display device in which faulty response regions are not formed in the initial state nor after long-term driving and a satisfactory display is maintained with less decrease in contrast, and a method for producing the same; and (2) providing a ferroelectric liquid crystal display device capable of maintaining a satisfactory display with less decrease in contrast over a wide range of storing temperatures and operating temperatures.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the tables and the drawings. Example 1

Figure 1:
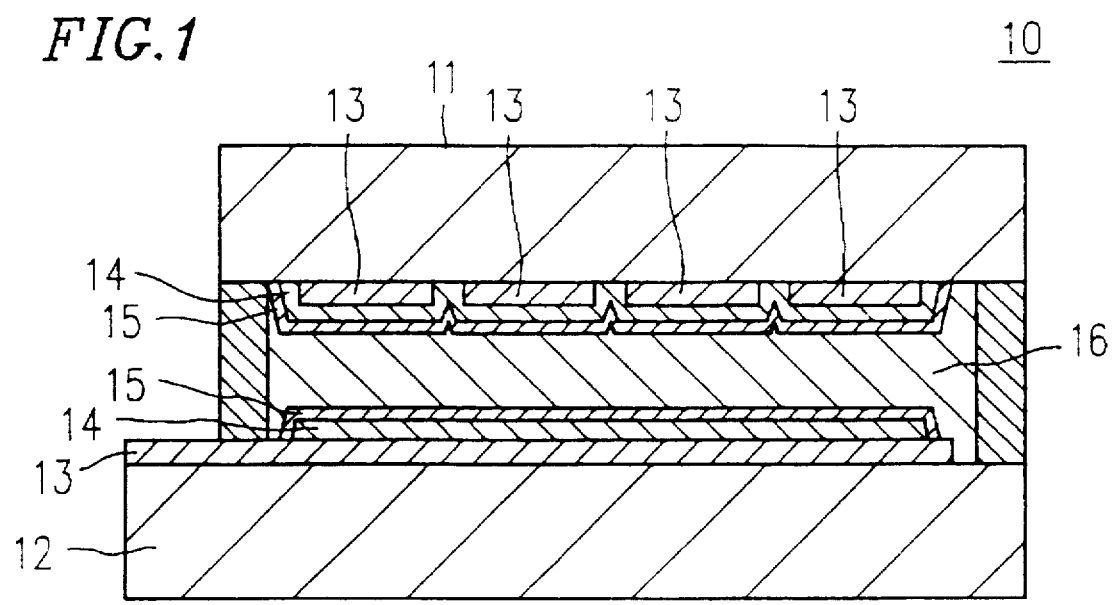
FIG. 1 is a cross-sectional view of a ferroelectric liquid crystal display device of Example 1 according to the present invention.

FIG. 1 is a cross-sectional view of a ferroelectric liquid crystal display device of Example 1 according to the present invention. The liquid crystal display device of Example 1 includes an upper substrate 11, a lower substrate 12, conductive thin films 13 formed on the upper and lower substrates 11 and 12, overcoats 14 formed on the respective conductive thin films 13, alignment films 15 formed so as to cover the respective overcoats 14, and a ferroelectric liquid crystal layer 16 interposed between the respective alignment films 15. The thickness of the ferroelectric liquid crystal layer 16 is controlled to 1.5 µm by dispersing glass beads having a diameter of 1.5 µm in the ferroelectric liquid crystal layer 16. The alignment films 15 formed on the upper and lower substrates 11 and 12 are subjected to rubbing treatment with rayon cloth in the identical direction. As the alignment films 15, an ether type silane coupling agent is used, and as the ferroelectric liquid crystal, a pyrimidine type material is used. The ferroelectric liquid crystal molecules of the ferroelectric liquid crystal layer 16 in the present example have a homogeneous orientation, that is, they are aligned almost in parallel with the upper and lower substrates 11 and 12. The angle of the ferroelectric liquid crystal molecules with respect to the upper and lower substrates 11 and 12 under the application of no voltage to the ferroelectric liquid crystal layer 16 (i.e., pretilt angle) is not higher than 1°.

In general, a ferroelectric liquid crystal mixture contains a mixture of a liquid crystal compound (base mixture) and a chiral compound. The base mixture is a smectic liquid crystal mixture exhibiting no ferroelectricity. The ferroelectric liquid crystal mixtures used in the examples of the present invention are prepared by mixing the base mixture in Table 1 and the chiral compound of either of three groups (α-group, β-group, and γ-group) in Table 2. As the ferroelectric liquid crystal mixture (referred to as a liquid crystal mixture L) in the present example, the chiral compound of the β-group is used. The transition temperature of the liquid crystal mixture L is shown as follows:

$$T_k < -25° \text{ C.}, T_{CA}=68° \text{ C.}, T_{AN}=76° \text{ C.}, \text{ and } T_{NI}=87° \text{ C.}$$

where $T_k$ is crystallization temperature; $T_{CA}$ is the transition temperature from the chiral smectic C phase to the smectic A phase; $T_{AN}$ is the transition temperature from the smectic A phase to the chiral nematic phase; and $T_{NI}$ is the transition temperature from the nematic phase to the isotropic liquid.

TABLE 1

| Chemical structure of L.C. compound |
|---|
| $C_8H_{17}O$–⟨phenyl⟩–$COO$–⟨phenyl⟩–$OC_6H_{13}$ |
| $C_8H_{17}O$–⟨pyrimidine⟩–⟨phenyl⟩–$C_8H_{17}$ |
| $C_8H_{17}O$–⟨pyrimidine⟩–⟨phenyl⟩–$C_{10}H_{21}$ |
| $C_{10}H_{21}O$–⟨pyrimidine⟩–⟨phenyl⟩–$OC_8H_{17}$ |
| $C_{10}H_{21}COO$–⟨pyrimidine⟩–⟨phenyl⟩–$OC_8H_{17}$ |

TABLE 1-continued

| Chemical structure of L.C. compound |
|---|
| $C_8H_{17}$–⟨pyrimidine⟩–⟨phenyl⟩–$OCOC_9H_{19}$ |
| $C_{12}H_{25}$–⟨pyrimidine⟩–⟨phenyl⟩–$OOCOC_9H_{19}$ |
| $C_8H_{17}OCOO$–⟨pyrimidine⟩–⟨phenyl⟩–$OC_8H_{17}$ |
| $C_{12}H_{25}OCOO$–⟨pyrimidine⟩–⟨phenyl⟩–$OC_8H_{17}$ |

TABLE 2

| Group | Chemical structure of chiral compound |
|---|---|
| α | $C_8H_{17}O$–⟨biphenyl⟩–$OCOCHCHC_2H_5$ with Cl, $CH_3$ substituents (two chiral centers *) |
| | $C_7H_{15}COO$–⟨biphenyl⟩–$OCOCHCHC_2H_5$ with Cl, $CH_3$ substituents (two chiral centers *) |
| β | $C_{11}H_{23}COO$–⟨biphenyl⟩–$COOCH_2CHCH_5$ with $CH_3$ substituent (chiral *) |
| | $C_8H_{17}O$–⟨phenyl⟩–$COO$–⟨biphenyl⟩–$OCH_2CH$–$CHC_2H_5$ with $OCH_3$ and $CH_3$ substituents (chiral *) |
| | $C_8H_{17}O$–⟨biphenyl⟩–$OCOCHC(CH_3)_2$ with $CH_2$ group (chiral *) |
| γ | $C_4H_9$–⟨epoxide⟩–$CH_2$–$O$–⟨phenyl⟩–⟨pyrazine⟩–⟨phenyl⟩–$C_6H_{13}$ |
| | $C_6H_{13}O$–⟨pyrazine⟩–⟨phenyl⟩–$O$–$CH_2$–⟨epoxide⟩–$C_4H_9$ |

TABLE 2-continued

| Group | Chemical structure of chiral compound |
|---|---|
| | $C_3H_7-\overset{O}{\underset{*}{\diagup}}\overset{O}{\underset{*}{\diagdown}}\overset{\|}{C}-O-\bigcirc-\overset{N}{=}-\bigcirc-OC_6H_{13}$ |

The relationship between the display characteristics and the smectic layer structure of the ferroelectric liquid crystal layer 16 and the orientation direction of liquid crystal molecules therein is studied in detail. Referring to FIGS. 2A to 2C, 3A to 3C, and 4A and 4B, the layer structure of the ferroelectric liquid crystal layer 16 and the orientation direction of liquid crystal molecules therein will be described in detail. In these figures, the reference numeral 201 denotes a bistable ferroelectric liquid crystal molecule; 202 denotes polarization axis directions of polarizing plates; 203 and 204 denote respective substrates; and 205 denotes a ferroelectric liquid crystal layer.

Figure 2A:
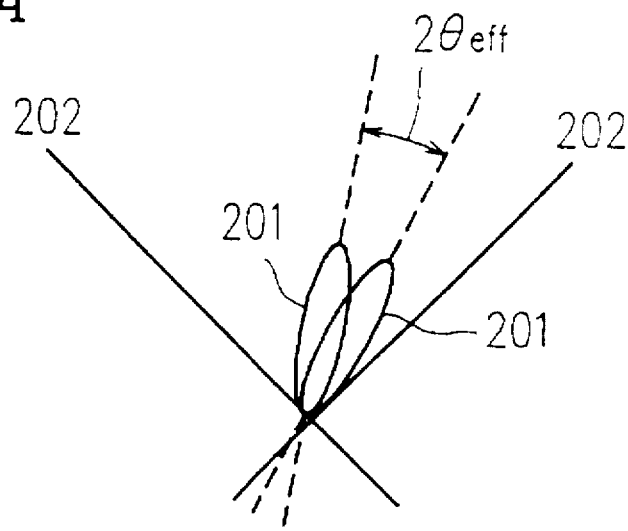
FIGS. 2A to 2C schematically show a layer structure of a ferroelectric liquid crystal layer immediately after being transitioned from a non-ferroelectric phase to a ferroelectric phase and two stable orientation directions of liquid crystal molecules.
Figure 2B:
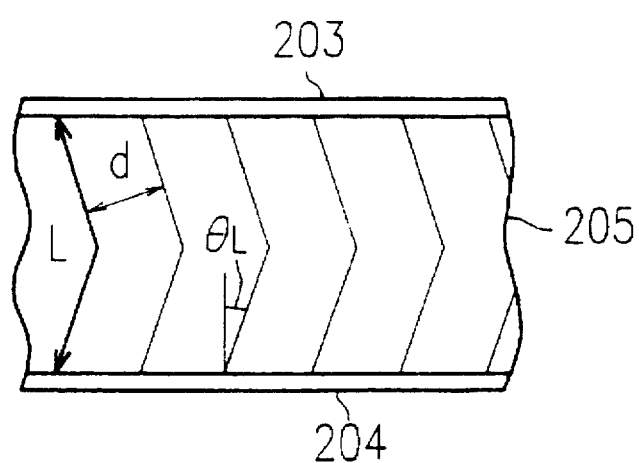
Figure 2C:
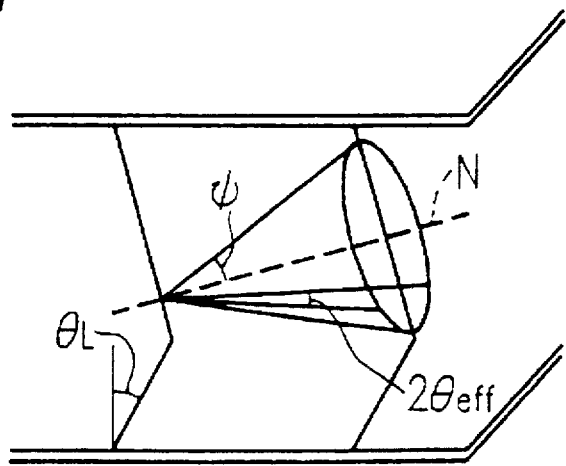
Figure 3A:
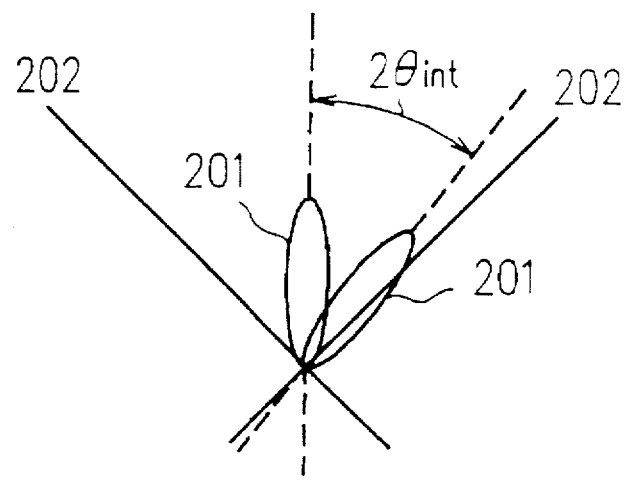
FIGS. 3A to 3C schematically show a layer structure of a ferroelectric liquid crystal layer immediately after an electric field treatment at 60° C. and two stable orientation directions of liquid crystal molecules.
Figure 3B:
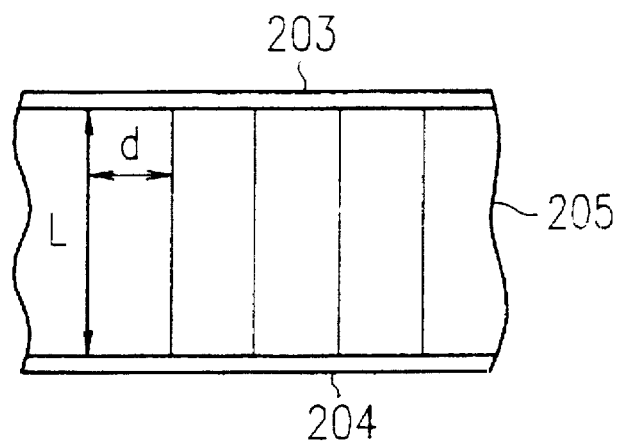
Figure 3C:
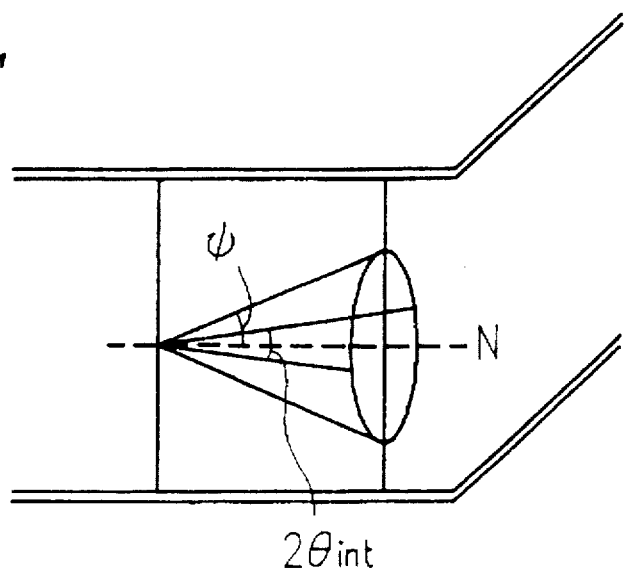

In the ferroelectric liquid crystal layer 16 immediately after being transitioned from a non-ferroelectric phase on a higher temperature side to a ferroelectric phase (first state), the angle 2θeff formed by the ferroelectric liquid crystal molecules 201 is as small as 25° as shown in FIG. 2A. For this reason, even though an electric field is applied to the ferroelectric liquid crystal layer 16 in the first state between two polarizing plates disposed in crossed Nicols, the polarization state of light transmitted through the ferroelectric liquid crystal layer 16 cannot be sufficiently changed, making it impossible to obtain a display with high contrast.

Figure 5:
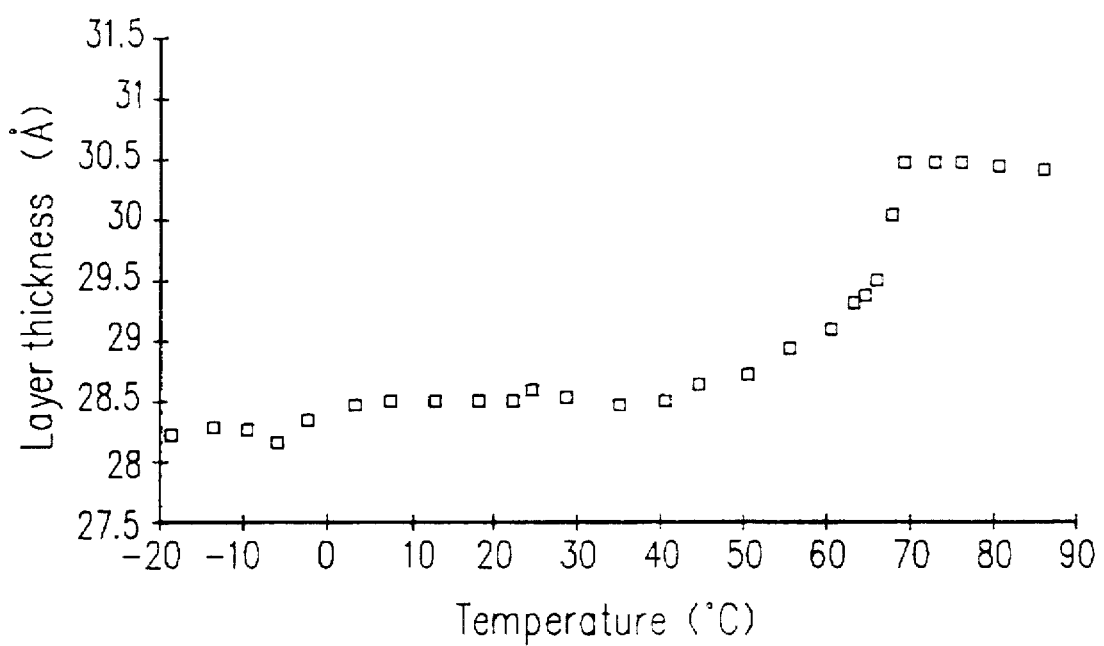
FIG. 5 is a graph showing the temperature dependence of smectic layer thickness of the ferroelectric liquid crystal layer in the ferroelectric liquid crystal display device of Example 1 according to the present invention.

Relatively small 2θeff of the ferroelectric liquid crystal layer 16 in the first state is caused by the Chevron structure thereof. Typically, the thickness d (interlayer spacing) of each smectic layer in the ferroelectric liquid crystal layer 16 becomes short with the decrease in temperature. The decrease in the layer thickness d with the decrease in temperature is ascribed to the increase in tilt angle of the liquid crystal molecules 201 with respect to the normal N of the smectic layer. Since the layer thickness d is obtained from the product of the length of the liquid crystal molecules 201 and cos ψ, when the tilt angle ψ is increased, the layer thickness d is decreased. When the layer thickness d is decreased, a length L of the smectic layer is increased so as to keep the volume of each smectic layer at a constant value. Thus, the length L of the smectic layer is likely to be increased with the decrease in temperature. Since the distance between the substrates 203 and 204 is fixed, the smectic layer is bent in the form of a V shape. The results obtained by measuring the temperature dependence of the layer thickness d of the pyrimidine type ferroelectric liquid crystal layer used in the present example by the X-ray diffraction method are shown in FIG. 5. As is understood from FIG. 5, the layer thickness d of the pyrimidine type ferroelectric liquid crystal layer used in the present example is monotonously decreased with the decrease in temperature in the chiral smectic C phase.

The effective bend angle of the smectic layer of the ferroelectric liquid crystal layer is defined as follows:

Assuming that the angle between two stable orientation directions of ferroelectric liquid crystal molecules at a certain temperature is 2θ, and the angle between two stable orientation directions of the ferroelectric liquid crystal molecules after an electric field treatment at the certain temperature is 2θint. An effective bend angle θL of the smectic layer at the certain temperature is obtained by the following Expression (1):

$$\theta L = \cos^{-1}(\cos \psi / \cos \theta) \quad (1)$$

Immediately after the electric field treatment, the smectic layers stand up in the direction almost perpendicular to the substrates. This corresponds to the case where θ is equal to θ int in Expression (1). Since θint is almost equal to ψ, the bend angle θL of each smectic layer immediately after the electric field treatment takes a small value (smaller than 1°). Here, the effective bend angle of the ferroelectric liquid crystal layer without the electric field treatment (i.e., first state) is particularly defined as θLeff. The value of θLeff is obtained by substituting θ with θeff.

In the present example, even at a storing temperature in the range of −20° C. to 60° C., a liquid crystal display device having outstanding display characteristics is produced. The term "storing temperature" in the present specification refers to an environmental temperature to which the liquid crystal display device is exposed after the production thereof. Examples of the storing temperature include a temperature of a warehouse for storing the liquid crystal display device and an environmental temperature while the liquid crystal display device is being transferred. In general, the storing temperature of the liquid crystal display device expands in a wider range than that of the environmental temperature at which the liquid crystal display device is actually used. The conventional liquid crystal display device has a problem of the change in display characteristics depending upon the past temperature history (storing temperature), even when used in a predetermined temperature range of use.

In the present example, the ferroelectric liquid crystal display device is heated up to 60° C. which is an upper limit of the storing temperature, and a rectangular wave with 30 volts and 15 Hz is applied to the ferroelectric liquid crystal layer with a thickness of 1.5 μm. If a rectangular wave with 15 volts having an electric field strength of less than 10 volts/μm is applied, the smectic layers do not sufficiently stand up, resulting in a ferroelectric liquid crystal layer with a nonuniform layer structure. In particular, when a rectangular wave with 15 volts having an electric field strength of 23 volts/μm or more is applied, the smectic layers can stand up uniformly. An electric field strength of 35 volts/μm or more is too strong to keep an entirely uniform layer structure. Furthermore, a rectangular wave with a frequency of 1 kHz or higher cannot sufficiently allow the smectic layers to stand up in the direction perpendicular to the substrates, and a rectangular wave at a frequency of less than 5 Hz makes it difficult to obtain a uniform layer structure. In particular, a rectangular wave at a frequency of 15 Hz or more and less than 1 kHz makes it easy to obtain a uniform layer structure.

As described above, the ferroelectric liquid crystal layer takes the second state after the electric field treatment, and the angle 2θint formed by two stable orientation directions becomes larger than 2θeff in the first state. A half of this angle, θint, at 60° C. is 40°. The smectic layers in the ferroelectric liquid crystal layer in the second state effectively stand up in a direction almost perpendicular to the substrates 203 and 205 (see FIG. 3B).

Figure 4A:
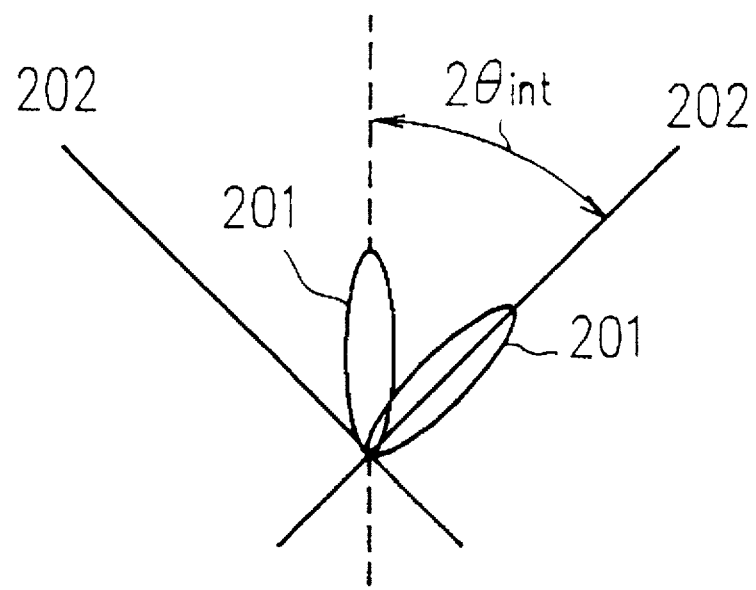
FIGS. 4A and 4B schematically show a layer structure of a ferroelectric liquid crystal layer cooled to room temperature after an electric field treatment and two stable orientation directions of liquid crystal molecules.
Figure 4B:
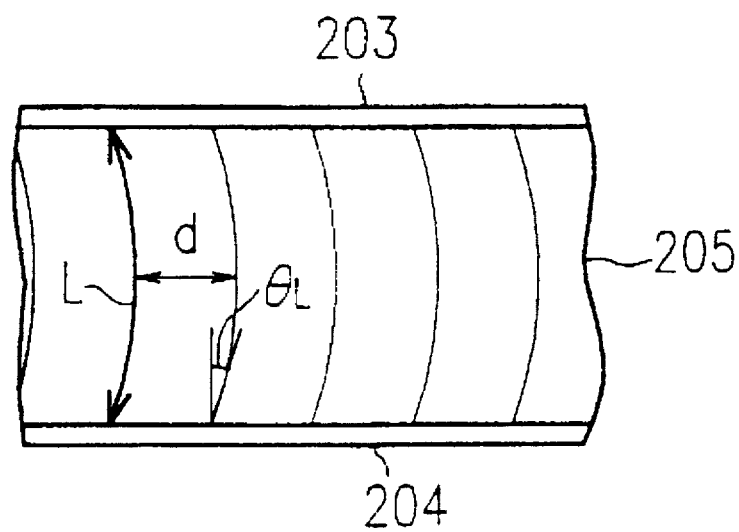

When the ferroelectric liquid crystal layer is cooled after the electric field treatment, the angle 2θint formed by the liquid crystal molecules 201 is slightly increased (see FIG. 4A). This is caused by the temperature dependence of the tilt angle as described above. At this time, the smectic layer is slightly bent (see FIG. 4B). As shown in FIG. 4A, a ferroelectric liquid crystal display device with outstanding contrast can be obtained by setting one of the polarization directions 202 of the two polarizing plates in crossed Nicols so as to be in parallel with one of the two orientation directions of the liquid crystal molecules 201.

Figure 6:
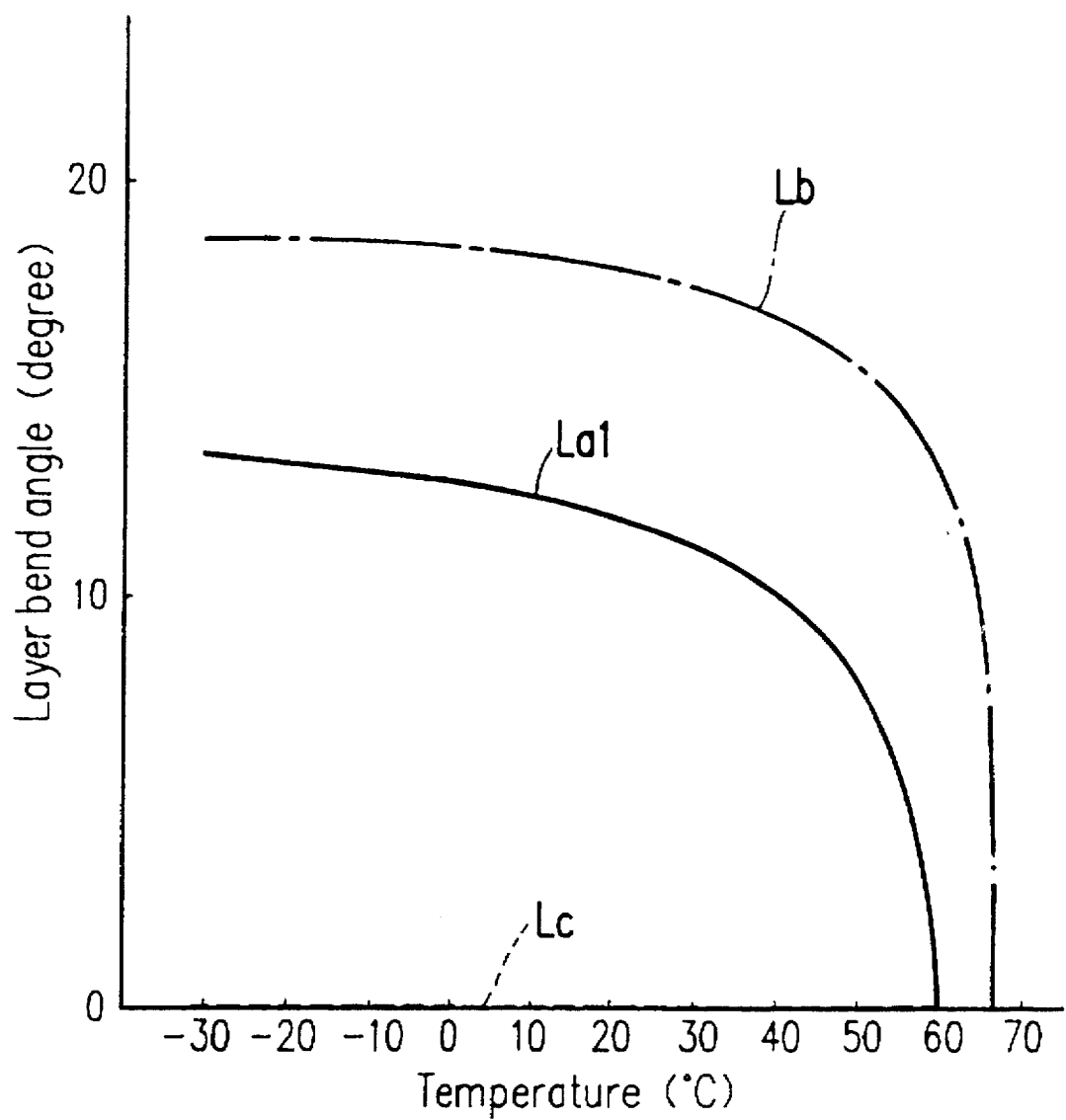
FIG. 6 is a graph showing the temperature dependence of smectic layer bend angle of the ferroelectric liquid crystal layer in the ferroelectric liquid crystal display device of Example 1 according to the present invention.

FIG. 6 is a graph showing the temperature dependence of smectic layer bend angle of the ferroelectric liquid crystal layer. In FIG. 6, the vertical axis of the graph represents an effective bend angle of the smectic layer, and the horizontal axis represents the temperature. A solid curve Lal represents an effective bend angle of the smectic layers in the ferroelectric liquid crystal layer after the electric field treatment at 60° C. Immediately after the electric field treatment at 60° C., the smectic layers stand up in a direction almost perpendicular to the substrates. However, the bend angle of the smectic layers is gradually increased with the decrease in temperature. The effective bend angle of the smectic layers in the ferroelectric liquid crystal display device of the present example is always 1° or larger at a storing temperature in the range of −20° C. to 60° C.

For comparison, a curve Lb representing the effective bend angle of the smectic layers of the ferroelectric liquid crystal layer in the first state immediately after being transitioned from a nonferroelectric phase to a ferroelectric phase, and a line Lc representing the effective bend angle of the smectic layers of the ferroelectric liquid crystal layer measured during the electric field treatment at each temperature are shown in FIG. 6. The curve Lb shows that the bend angle in the first state is larger than that in the second state over the entire temperature range. The line Lc shows that the effective bend angle is almost 0° and the smectic layers stand up in a direction perpendicular to the substrates.

In the layer structure of the ferroelectric liquid crystal, the smectic layers take the following states depending upon the following conditions:

In the ferroelectric liquid crystal layer (curve Lb) in the first state, the smectic layers are most bent; in the ferroelectric liquid crystal layer (line Lc) during the electric field treatment at each temperature, the smectic layers stand up in a direction almost perpendicular to the substrates; and in the ferroelectric liquid crystal layer (line Lal) after the electric field treatment at 60° C., the smectic layers are mildly bent.

Figure 7:
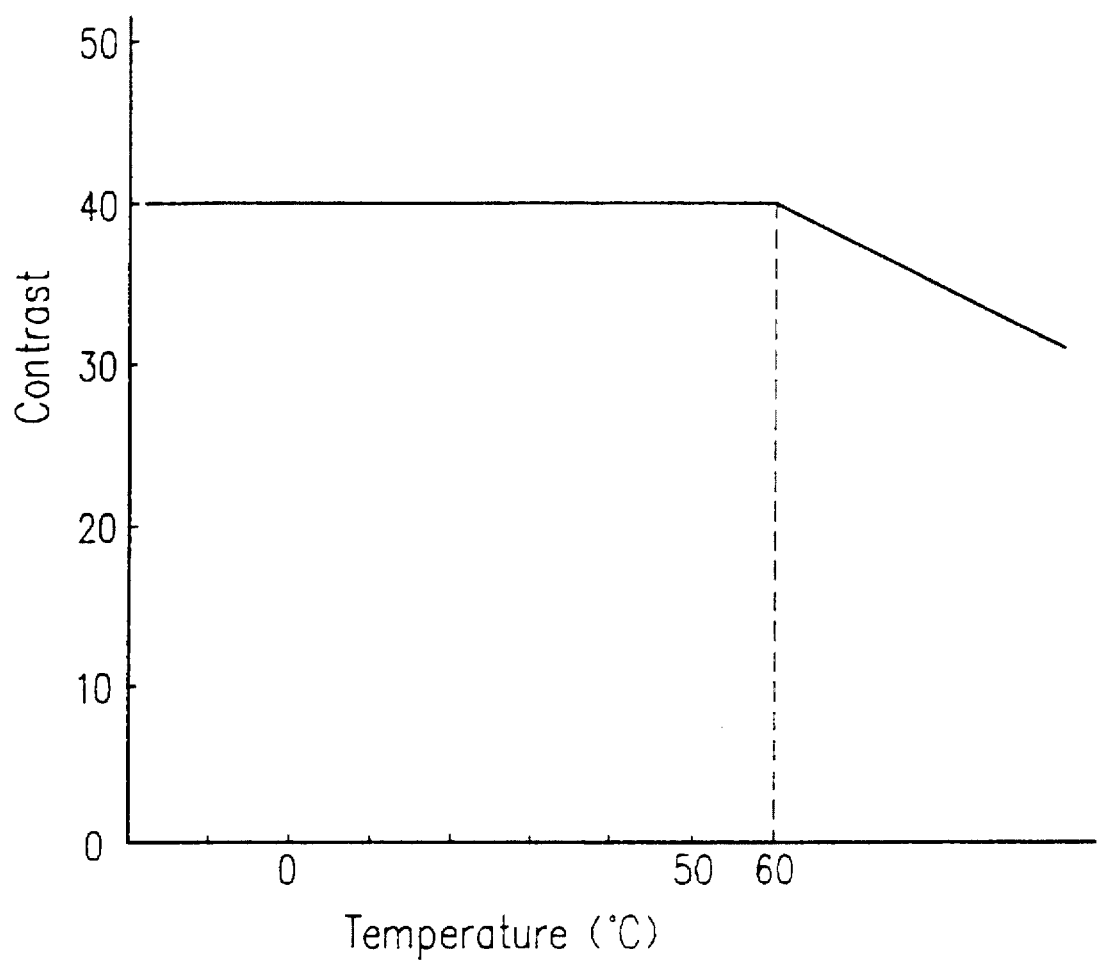
FIG. 7 is a graph showing the temperature dependence of contrast of the ferroelectric liquid crystal display device of Example 1 according to the preset invention.

The decrease in contrast occurring in accordance with a display pattern, which has been a problem in a conventional ferroelectric liquid crystal display device, will not occur until the temperature of the ferroelectric liquid crystal display device is increased to almost 60° C. or more, as shown in FIG. 7. This phenomenon can be caused as follows:

The smectic layers in the ferroelectric liquid crystal display device of the present example are bent. The smectic layer thickness of the ferroelectric liquid crystal layer becomes larger with the increase in temperature, and the length of the smectic layers becomes smaller with the increase in temperature so as to relax the change in volume of each smectic layer. In the case where the smectic layers are bent at a temperature of 60°C. or lower, the length of the smectic layers can be made smaller by making the bend angle of the smectic layers small. Thus, at a temperature of 60° C. or less, the change in smectic layer thickness is relaxed by the change in bend angle of the smectic layers, preventing the direction of the smectic layers from being changed inside the panel.

However, the curve Lal is matched with the curve Lc at a temperature exceeding 60° C. This matching shows that the smectic layers of the ferroelectric liquid crystal layer after being applied with an electric field at 60° C. stand up in a direction perpendicular to the substrates. Since the change in smectic layer thickness cannot be relaxed by the change in bend angle of the smectic layer, the deformation of the smectic layer structure is caused inside the ferroelectric liquid crystal layer. Since the direction of the smectic layers in the liquid crystal layer is changed so as not to change the orientation directions of the liquid crystal molecules in the case where the ferroelectric liquid crystal molecules are in two orientation states, the smectic layers are shifted from each other in two directions in accordance with a display pattern. Contrast is determined by a relative angle of the orientation direction of the liquid crystal molecules and the polarization axis direction of the polarizing plates, so that the difference in the direction of the smectic layers in the ferroelectric liquid crystal layer in two regions is exhibited as the difference in contrast. As a result, as shown in FIG. 7, when the environmental temperature exceeds 60° C., contrast will decrease.

Thus, by setting the effective bend angle of the ferroelectric liquid crystal at 0° or larger in the range of the storing temperature of the ferroelectric liquid crystal display device, the change in the smectic layer thickness can be relaxed by changing the cross-sectional structure of the smectic layers. More specifically, the decrease in contrast in accordance with a display pattern with the change in temperature can be prevented.

The above-mentioned conditions are equivalent to the fact that the layer thickness of the smectic layers immediately after the electric field treatment is the largest in a temperature range in which the liquid crystal display device is stored. The layer thickness at this time shows the same behavior as that shown in FIG. 5.

The decrease in contrast with the change in temperature occurred in a conventional liquid crystal display device (Japanese Laid-Open Patent Publication No. 62-2209) has been ascribed to the electric field treatment at room temperature. Thus, the decrease in contrast in a temperature region not more than the storing temperature can be prevented by conducting the electric field treatment at the upper limit temperature of the storing temperature instead of at room temperature. However, although the problem of the decrease in contrast can be solved by conducting the electric field treatment at higher temperatures, various other problems might occur. One example of these problems is the generation of zigzag defects in the initial state.

When the liquid crystal display device is cooled to room temperature after the electric field treatment at 60° C., so-called zigzag defects sometimes occur on a screen. The liquid crystal regions at the periphery of these defects have a threshold voltage different from that of the other regions. The zigzag defects are the same as those often seen in the first state immediately after the transition from a nonferroelecctric phase to a ferroelectric phase. The zigzag defects are hardly seen when the smectic layers of the ferroelectric liquid crystal layer stand up in the direction perpendicular to the substrates immediately after the electric field treatment.

Figure 8:
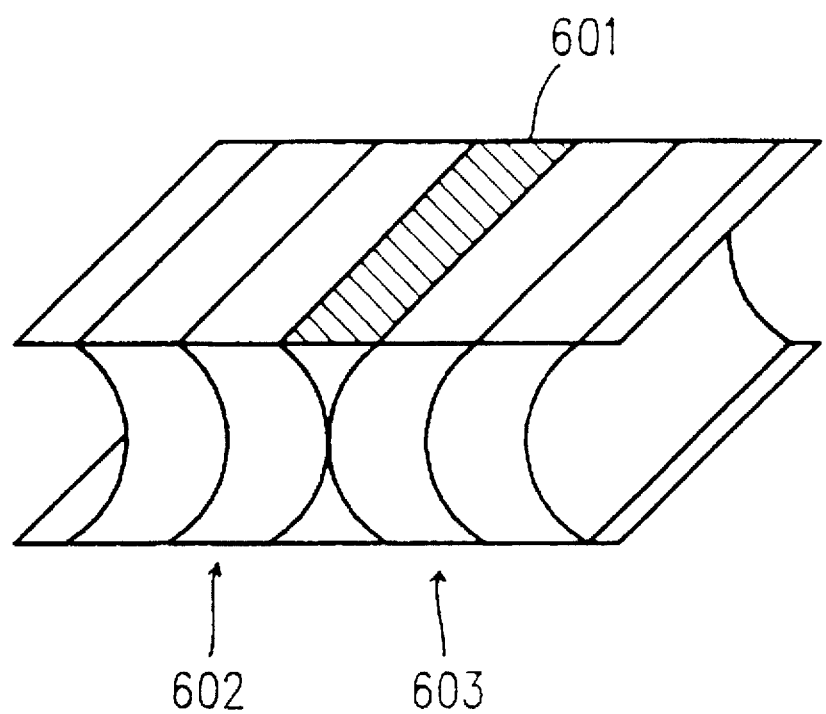
FIG. 8 schematically shows zigzag defects caused after the electric field treatment of a conventional ferroelectric liquid crystal display device.

It is considered that the zigzag defects are caused as follows:

Assuming that the liquid crystal molecules in the vicinity of the substrates are aligned almost parallel with the substrates. Since the probability at which the smectic layers are bent in the right direction as in a region 602 (FIG. 8) is identical to the probability at which the smectic layers are bent in the left direction as in a region 603, the smectic layers bent in the right and left directions are both present in the liquid crystal layer. In this case, the boundary portion between the regions 602 and 603 has the orientation of liquid crystal molecules different from that of the other regions. Thus, the boundary portion has a threshold value different from that of the other regions. This is exhibited as the zigzag defects 601.

Referring to FIG. 6, in the ferroelectric liquid crystal layer after the electric field treatment at 60° C. represented by the curve Lal, the smectic layers are slightly bent, so that small zigzag defects are caused. The zigzag defects are less as the curve Lal is closer to the line Lc. In order to prevent the zigzag defects from generating to an extent that display characteristics are not affected, the effective bend angle of the smectic layers are preferably 15° or lower at room temperature. When the effective bend angle at room temperature exceeds 15°, the threshold voltage (drive voltage) of a portion in which the zigzag defects are caused becomes very low, rendering it impossible to perform a uniform display in the entire ferroelectric liquid crystal layer. This shows that the difference between the angle 2θformed by the liquid crystal molecules at room temperature and the angle 2θint formed by the liquid crystal molecules immediately after the electric field treatment at room temperature is 10° or less. When the effective bend angle θL of the smectic layers over the entire range of a temperature of use is 15° or less, no problems arise in terms of practical use. The liquid crystal display device of the present example enables an outstanding display at a temperature of use in the range of 5°C. to 40° C. Furthermore, as long as the liquid crystal display device is stored at a temperature in the range of –20° C. to 60° C., an outstanding display can be performed over the above range of temperature of use.

The smectic layer bend angle involved in the decrease in temperature represented by the curve Lal shown in FIG. 6 is rapidly changed in the range of a phase transition temperature $T_{CA}$ to a temperature lower than the phase transition temperature $T_{CA}$ by about 5° C. Thereafter, the increase in the change in smectic layer bend angle becomes mild. This abruptness of the change in smectic layer bend angle largely depends upon the temperature range of a phase transition sequence of the ferroelectric liquid crystal mixture. The ferroelectric liquid crystal mixture preferably used in the liquid crystal display device of the present invention exhibits a chiral smectic C phase showing ferroelectricity, a smectic A phase, a chiral nematic phase, and an isotropic liquid phase in the course of an increasing temperature. The rising abruptness of the curve Lal depends upon the transition temperature $T_{CA}$ from the chiral smectic C phase to the smectic A phase and the transition temperature $T_{AN}$ from the smectic A phase to the chiral nematic phase, and a parameter P defined by the following Expression (2) becomes important. In Expression (2), the temperature is represented by centigrade.

$$P = (T_{CA} + 273)/(T_{AN} + 273) \quad (2)$$

In the case where the parameter P in Expression (2) is in the range of 0.97 to 0.995, the temperature dependence of the smectic layer bend angle is abrupt in the range of about 5°C. from the phase transition temperature $T_{CA}$ and becomes mild at a temperature lower than that range. By using the ferroelectric liquid crystal mixture satisfying the above conditions, the effective smectic layer bend angle can be suppressed to a relatively small value even in the case where the electric field treatment is conducted at higher temperatures. In the present example, two phase transition temperatures $T_{CA}$ and $T_{AN}$ are respectively 68° C. and 76° C., and the parameter P is 0.977. In the case where the parameter P is 0.996, the temperature range in which the smectic A phase is exhibited is too narrow, so that satisfactory orientation of liquid crystal molecules cannot be obtained. In the case where the parameter P is 0.96, the condition of θL<15° cannot be satisfied by the electric field treatment at 60° C., at a temperature not higher than room temperature.

In order to suppress the effective bend angle of the smectic layers, it is effective to use liquid crystal having a high phase transition temperature. In the case of using a ferroelectric liquid crystal mixture having a phase transition temperature $T_{CA}$ of 65° C. or higher, in which the smectic layer bend is almost increased in the temperature range from the phase transition temperature $T_{CA}$ to a temperature lower than the phase transition temperature $T_{CA}$ by 5° C., the difference between the curve Lal and the line Lc shown in FIG. 6 can be suppressed to 15° C. or less.

The condition that the effective bend angle of the smectic layer is 15° or less shows that the change in layer thickness at 60° C. or less is less and the change in layer thickness in a temperature range in which the liquid crystal display device is stored is 2Å or less.

In summary, in order to suppress the zigzag defects to an extent that the display characteristics are not affected, the effective bend angle of the smectic layers in the range of a temperature of use should be 15°or less. This is equivalent to the fact that (2θint⁻2θ) in the range of a temperature of use is 10° or less. In order to satisfy this condition, the ratio P between $T_{CA}$ and $T_{AN}$ represented by absolute temperatures should be in the range of 0.97 to 0.995, and the phase transition temperature $T_{CA}$ to the ferroelectric liquid crystal phase should be 65° C. or higher. In addition, the change in the layer thickness depending upon temperature may be 2Å or less in a temperature range in which the liquid crystal display device is stored.

Next, the problems caused in continuous driving will be described.

The above-mentioned condition that the effective bend angle of the smectic layers at room temperature is 15° or less is also applied for obtaining a ferroelectric liquid crystal display device without any decrease in display characteristics while being continuously driven.

Figure 9:
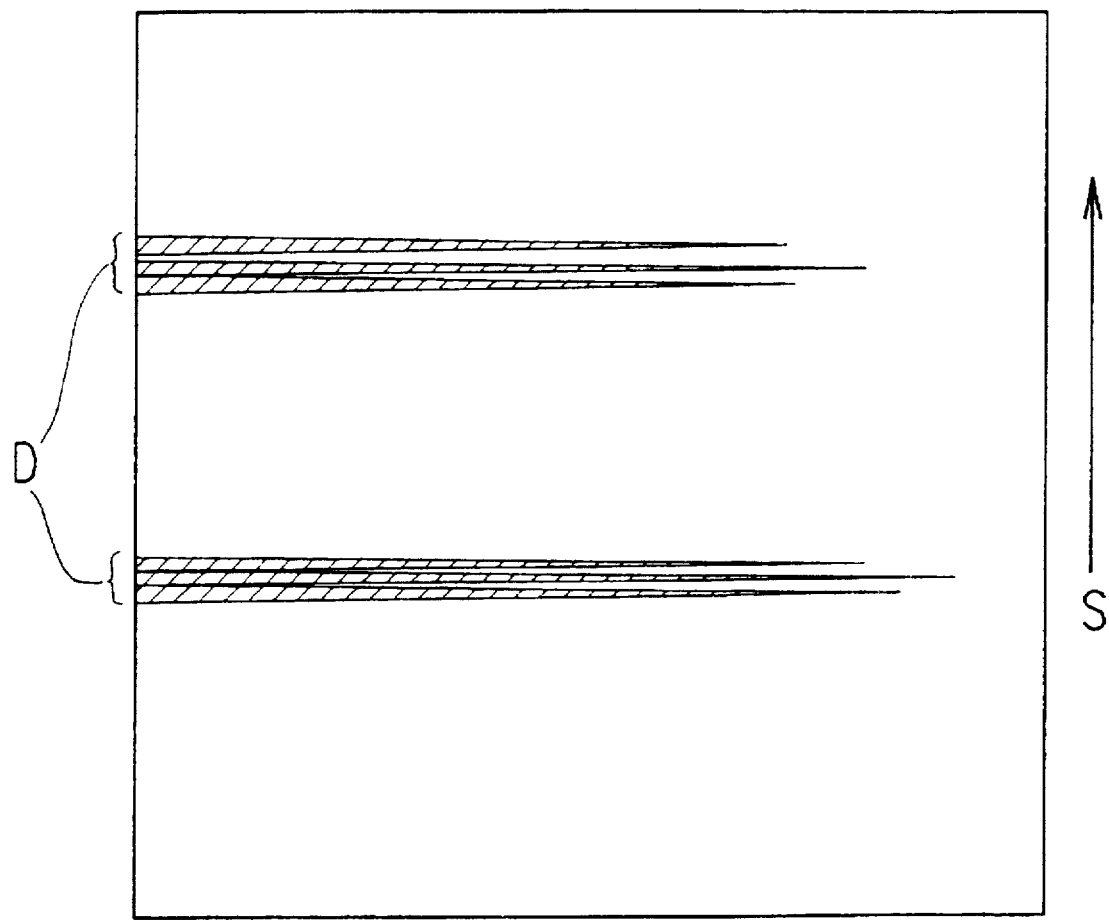
FIG. 9 schematically shows display defects caused in the case of continuously driving the conventional ferroelectric liquid crystal display device.

If a ferroelectric liquid crystal display device enabling a satisfactory display in initial characteristics is continuously driven, line-shaped defects (hereinafter, referred to as response impossible region) are sometimes caused. FIG. 9 is a conceptual view of the response impossible region D. The response impossible region D is formed in the direction perpendicular to a stacked direction S of the smectic layers.

The inventors of the present invention have found that this phenomenon depends upon the spontaneous polarization charge and the amount of ions in a ferroelectric liquid crystal layer and the effective bend angle OLeff of the smectic layers in the ferroelectric liquid crystal layer in the first state immediately after being transitioned from a non-ferroelectric phase.

The response impossible region is caused, when the liquid crystal display device is continuously driven and the bend angle of the smectic layer becomes locally large. The response impossible region has a low response voltage (threshold voltage) and the voltage margin for uniformly driving an entire panel of a liquid crystal display device becomes small.

Figure 10:
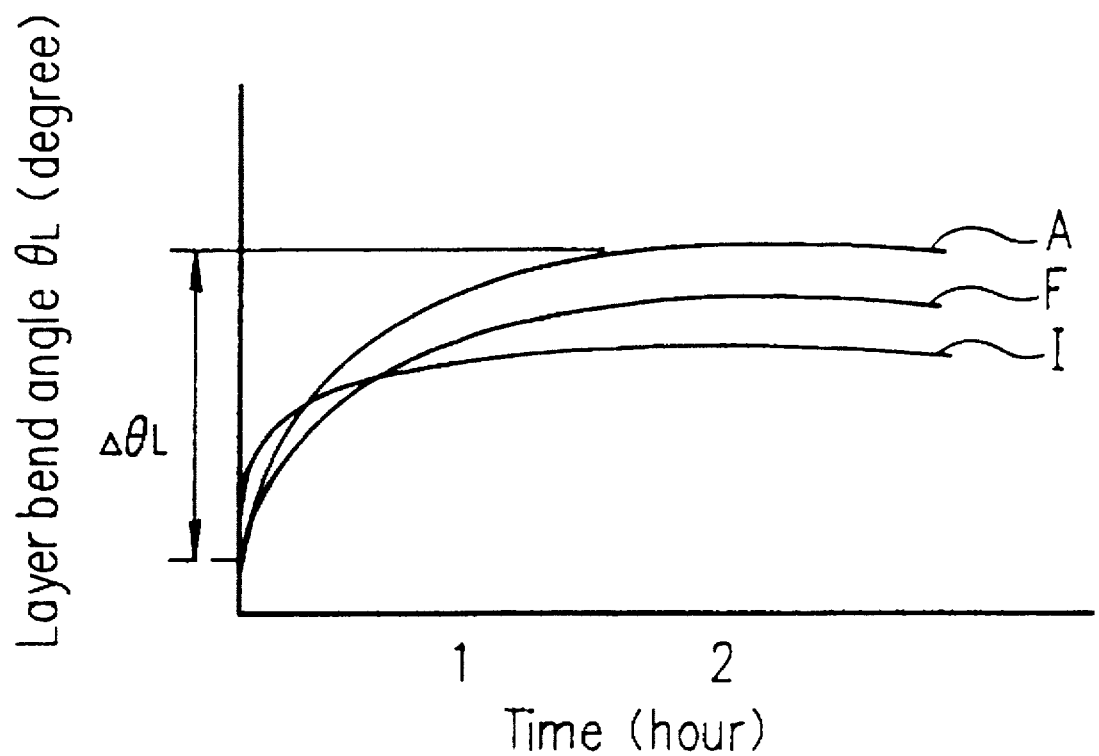
FIG. 10 is a graph showing the change in smectic layer bend angle in the case of continuously driving a ferroelectric liquid crystal display device after an electric field treatment.

The increase in the effective bend angle caused by the continuous driving is measured as follows:

An average bend angle measured throughout the entire liquid crystal display device becomes larger by continuous driving and is saturated in 10 minutes to several hours. FIG. 10 shows the change in average bend angle with time. Assuming that an average bend angle of the smectic layer after the continuous driving is θLd, and an average bend angle before the driving is θL, the amount of increase in the average bend angle by the continuous driving, that is, "change in layer bend angle" Δ θL is defined by the following Expression (3):

$$\Delta\theta L = \theta Ld - \theta L \qquad (3)$$

As described below, liquid crystal materials having different θLeff, Ps, and Q were prepared and an experiment was conducted using these materials. As a result, satisfactory display characteristics were obtained in the case where Δ θL was 5° or less.

A chiral compound of β-group in Table 2 was added to a base mixture in Table 1. Then, a one-wing type liquid crystal compound represented by Formula (1) was added to the resulting mixture to prepare ferroelectric liquid crystal materials A to C having different effective layer bend angles θLeff in the first state. As the one-wing type liquid crystal compound, a liquid crystal compound in Table 3 was added to regulate the effective layer bend angle θLeff in the first state. The phase transition temperature $T_{CA}$ of the ferroelectric liquid crystal materials A to C shown in Table 4 was 66 ±1°C.

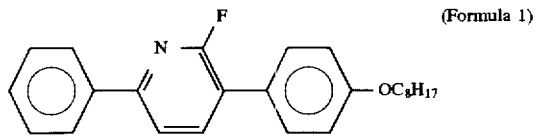

(Formula 1)

TABLE 3

Chemical structure of L.C. compound

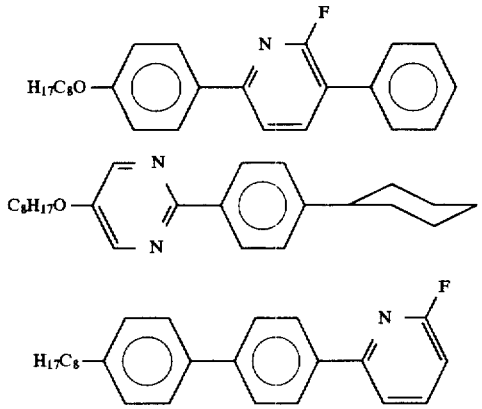

TABLE 4

| L.C. material | θLeff [deg.] | θL [deg.] |
|---|---|---|
| A | 24.5 | 5.2 |
| B | 21.7 | 4.5 |
| C | 17.9 | 2.7 |

Ferroelectric liquid crystal display devices produced by using the ferroelectric liquid crystal materials A to C were subjected to an electric field treatment at 40° C. and were continuously driven at 25°C. The relationships between θLeff and Δ θL obtained in this case are shown in Table 4. The structure of each ferroelectric liquid crystal display device is the same as that shown in FIG. 1, and a rectangular wave with 30 volts and 15 Hz was used for the electric field treatment. The liquid crystal display devices were continuously driven for 10 minutes or more at a voltage 1.5 times a central value for the drive voltage margin (the difference between a rise voltage in an ON-waveform and a rise voltage in an OFF-waveform). This driving condition is referred to as overdriving. When the liquid crystal display devices were overdriven for about 10 minutes, the change in layer bend angle was saturated. It was confirmed that the layer bend angle reached a steady state by the overdriving was almost equal to the layer bend angle reaching a steady state by performing a continuous driving at an ordinary drive voltage for a long period of time.

Figure 11:
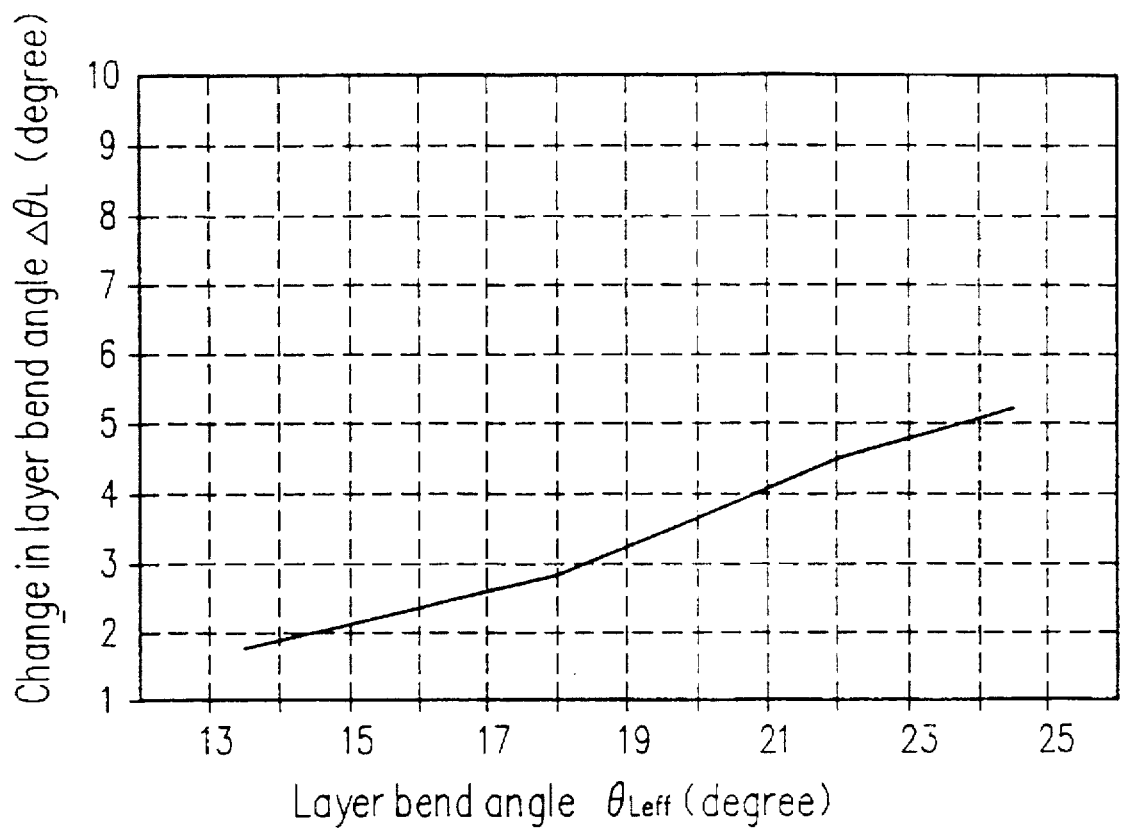
FIG. 11 is a graph showing the relationship between the smectic layer bend angle of ferroelectric liquid crystal in the first state before an electric field treatment and the change in smectic layer bend angle.

FIG. 11 is a graph showing the relationship between the smectic layer bend angle in the first state of ferroelectric liquid crystal before the electric field treatment and the change in smectic layer bend angle. It is noted that the effective layer bend angle was obtained at room temperature (25° C.). In the ferroelectric liquid crystal display devices using the ferroelectric liquid crystal materials B and C having the effective layer bend angle θLeff in the first state of 24° or less, line-shaped defects were not found even after continuous driving. By using the ferroelectric liquid crystal material having an effective bend angle θLeff of the smectic layer in the first state of 24°or less, the change in layer bend angle Δ θL after continuous driving can be decreased, and a ferroelectric liquid crystal display panel having a satisfactory display quality without any line-shaped defects can be obtained.

The correlation between the spontaneous polarization charge Ps and the change in layer bend angle Δ θL of the ferroelectric liquid crystal material was studied. A racemic body of a chiral compound contained in each ferroelectric liquid crystal material was mixed in the ferroelectric liquid crystal material to regulate the spontaneous polarization charge Ps of each material. In the present example, materials in Table 1 were used as a base mixture, and materials of ψ-group in Table 2 were used as a chiral compound. In order to eliminate the influence of θLeff, θLeff of the ferroelectric liquid crystal material was regulated to 24° or less. For regulating θLeff, the compound of Formula (1) and the one-wing type liquid crystal compound in Table 6 were added. The phase transition temperature $T_{CA}$ of the resulting ferroelectric liquid crystal material was 66±1° C. without being affected by the additives.

Figure 12:
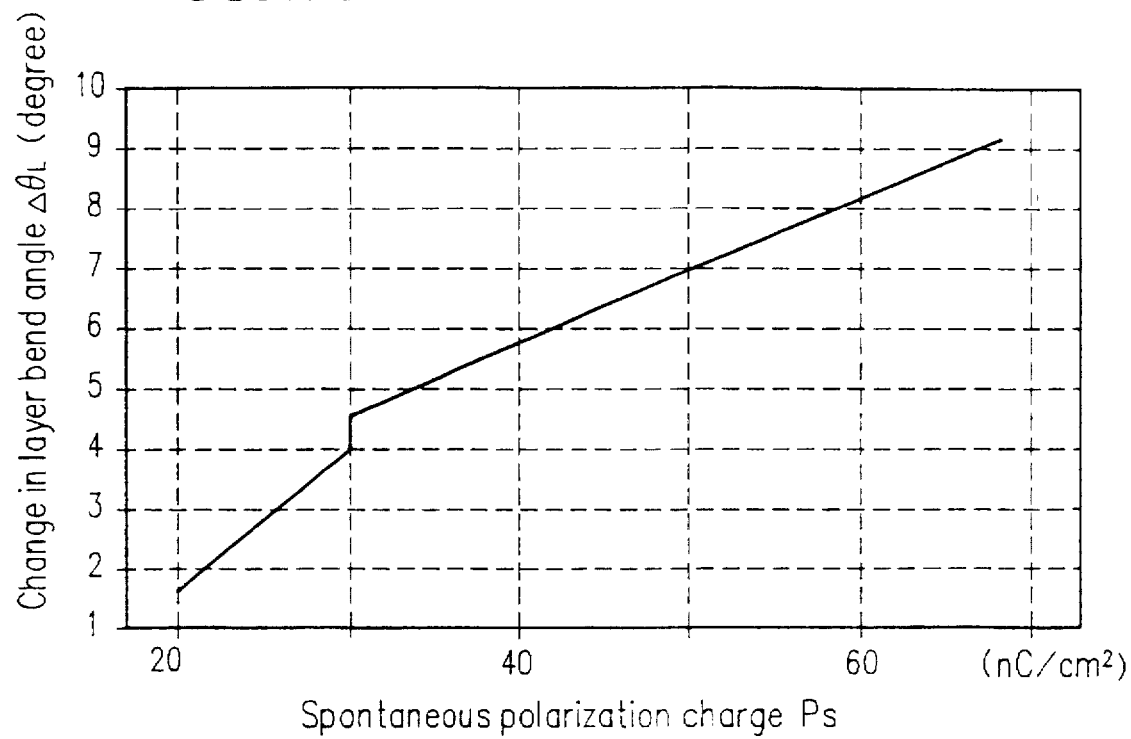
FIG. 12 is a graph showing the relationship between the spontaneous polarization charge of ferroelectric liquid crystal and the change in smectic layer bend angle.

The liquid crystal display devices were subjected to an electric field treatment at 40° C. and then were overdriven at 25° C. under the same conditions as those of the previously conducted experiment. Table 5 shows the experimental results of the spontaneous polarization charge Ps and the effective bend angle θLeff of the smectic layers in the first state of the liquid crystal material used in the present experiment, and the change in layer bend angle Δ θL after continuous driving. FIG. 12 shows the relationship between the spontaneous polarization charge Ps of the liquid crystal material and the change in layer bend angle Δ θL after continuous driving. The effective bend angle of the smectic layers and the spontaneous polarization charge were measured at room temperature (25° C.).

TABLE 5

| L.C. material | Ps $|nC/cm^2|$ | θLeff $|deg.|$ | ΔθL $|deg.|$ |
|---|---|---|---|
| D | 68 | 23 | 9.1 |
| E | 30 | 20 | 4.6 |
| F | 30 | 22.6 | 4.1 |
| G | 20 | 19.7 | 1.6 |
| H | 20 | 22.9 | 1.5 |

In the ferroelectric liquid crystal display devices using the ferroelectric liquid crystal materials E, F, G, and H having a spontaneous polarization charge of 30 nC/cm² or less as shown in Table 5, line-shaped defects after the continuous driving were not seen.

As described above, by using the ferroelectric liquid crystal material having a spontaneous polarization charge Ps of 30 nC/cm² or less, the change in layer bend angle Δ θL after continuous driving can be made 5° or less, and a ferroelectric liquid crystal display device with a satisfactory display quality without any line-shaped defects can be obtained.

The correlation between the amount of ions Q per unit area and the change in layer bend angle Δ θL of the ferroelectric liquid crystal materials were studied. In the same way as described above, the materials in Table 1 were used as a base mixture, and the chiral compounds of β-group in Table 2 were used as a chiral mixture. This ferroelectric liquid crystal material was the same as the liquid crystal material C in Table 4. The amine type compound represented by Formula (2) was added to the liquid crystal material C to regulate the amount of ions in the liquid crystal material. By regulating the added amount of the amine type compound, the ferroelectric liquid crystal material with the amount of ions Q changed was obtained. The transition temperature $T_{CA}$ of the resulting liquid crystal material was not changed with the addition of the amine type compound (i.e., 66±1° C.).

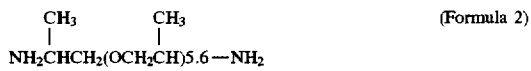
(Formula 2)

Figure 13:
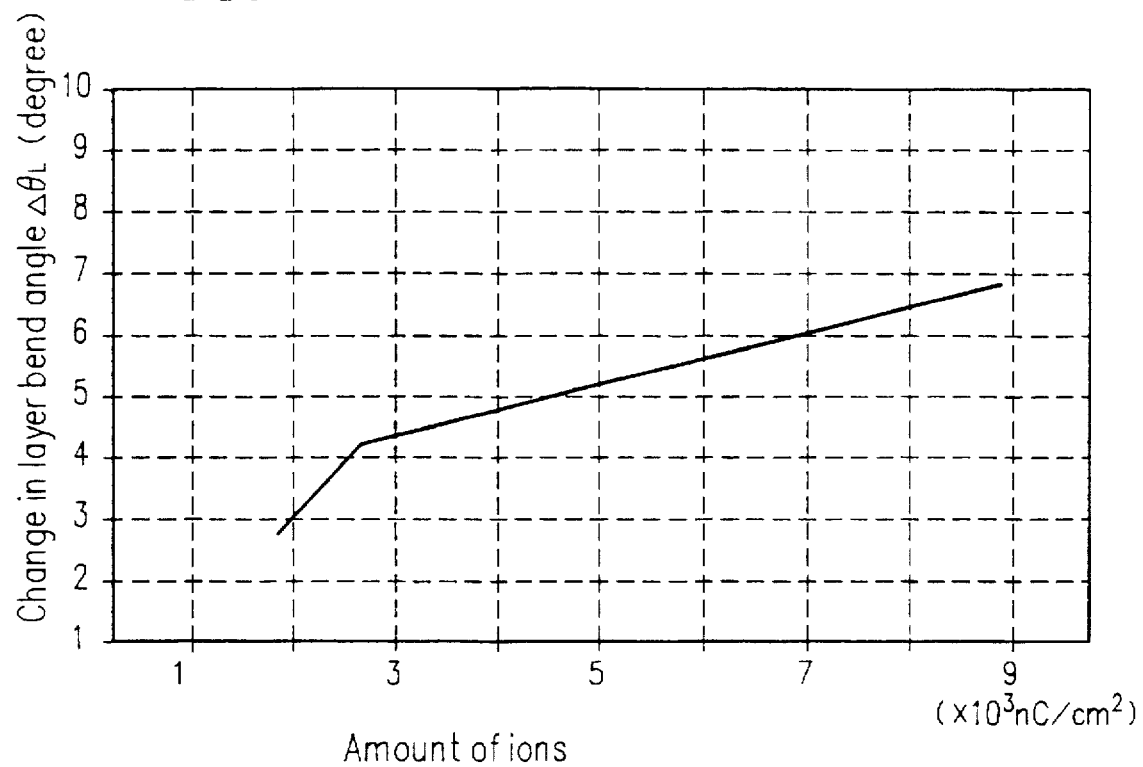
FIG. 13 is a graph showing the relationship between the amount of ions per unit area of ferroelectric liquid crystal and the change in smectic layer bend angle.

The liquid crystal display device was subjected to the electric field treatment at 40°C. and was overdriven at 25° C. under the same conditions as those of the previous experiment. The amount of ions per unit area was obtained by applying a rectangular wave with 2 volts and 0.01 Hz to the liquid crystal display device and integrating a current flowing in one cycle. Table 6 shows the correlation between the amount of ions Q per unit area of the ferroelectric liquid crystal material and the change in layer bend angle Δ θL after continuous driving. FIG. 13 shows the relationship between the amount of ions Q per unit area of the ferroelectric liquid crystal material and the change in layer bend angle Δ θL after continuous driving.

TABLE 6

| L.C. material | Q $|nC/cm^2|$ | ΔθL $|deg.|$ |
|---|---|---|
| I | 1926 | 2.7 |
| J | 2696 | 4.3 |
| K | 8833 | 6.8 |

In the ferroelectric liquid crystal display devices using the ferroelectric liquid crystal materials I and J having the amount of ions Q of 5000 nC/cm² or less in Table 6, line-shaped defects after continuous driving were not seen.

As described above, by using a ferroelectric liquid crystal material having the amount of ions of 5000 nC/cm² or less per unit area, the change in layer bend angle Δ θL after the continuous driving can be made small, and a ferroelectric liquid crystal display device with a satisfactory display quality without any line-shaped defects can be obtained.

The materials used in the present invention are not limited to those in the present example. As a ferroelectric liquid crystal material, liquid crystal materials other than those of pyrimidine type can be used. Furthermore, the additive is not limited to those of an amine type. As a chiral compound, compounds other than those shown in Table 2 can be used. An alignment film is not limited to an ether type silane coupler. In particular, when an alignment film having a high pretilt angle is used, zigzag defects can be prevented.

In the case where the spontaneous polarization charge Ps and the amount of ions Q satisfy the above-mentioned conditions, the line-shaped defects can be prevented by using a ferroelectric liquid crystal material having the change in layer bend angle Δ θL after continuous driving of 5° or less. When the spontaneous polarization charge Ps is 10 nC/cm² or more, the characteristics of ferroelectric liquid crystal can be maintained. Remaining images caused by the polarization of an internal charge can be prevented by making the amount of ions Q per unit area of the ferroelectric liquid crystal twice or more of the spontaneous polarization charge of the ferroelectric liquid crystal material.

In the above-mentioned experiments, the electric field treatment was conducted at 40° C. while setting the upper limit of the storing temperature at 40° C. Even in the case of a storing temperature of, for example, 60° C., as long as Ps and Q satisfy the above-mentioned conditions, a ferroelectric liquid crystal display device without any line-shaped defects is obtained after continuous driving.

Example 2

A ferroelectric liquid crystal display device of Example 2 according to the present invention will be described with reference to the drawings.

The ferroelectric liquid crystal display device of Example 2 has the same structure as that of Example 1, and a ferroelectric liquid crystal material which is different from that of Example 1 is used in the present example.

Figure 14:
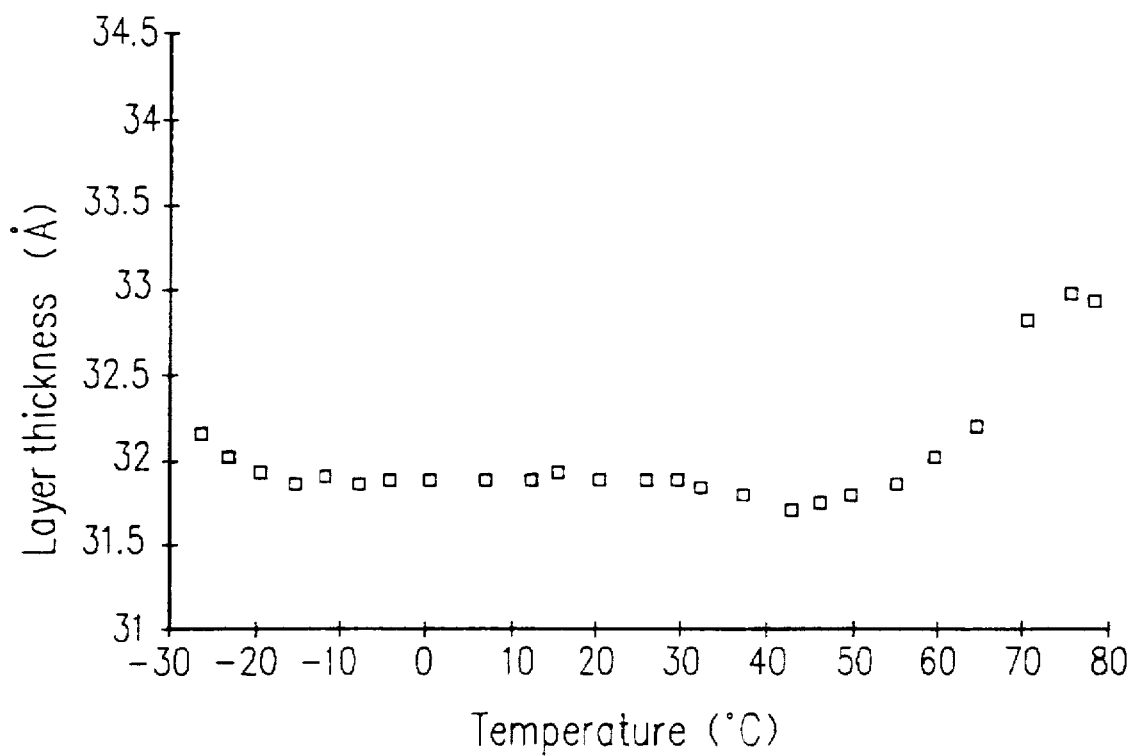
FIG. 14 is a graph showing the temperature dependence of the smectic layer thickness of a ferroelectric liquid crystal layer in a ferroelectric liquid crystal display device of Example 2 according to the present invention.

The layer thickness of most of ferroelectric liquid crystal materials is monotonously decreased with the decrease in temperature in the same way as in a pyrimidine type ferroelectric liquid crystal material used in Example 1. However, the layer thickness of ferroelectric liquid crystal material, in which the amount of the material of the α-group in Table 2 mixed with the base mixture in Table 1 is increased, is once decreased with the increase in temperature and then starts increasing as shown in FIG. 14. The present example shows that a liquid crystal material having such a property can be applied to a ferroelectric liquid crystal display device according to the present invention.

Figure 15:
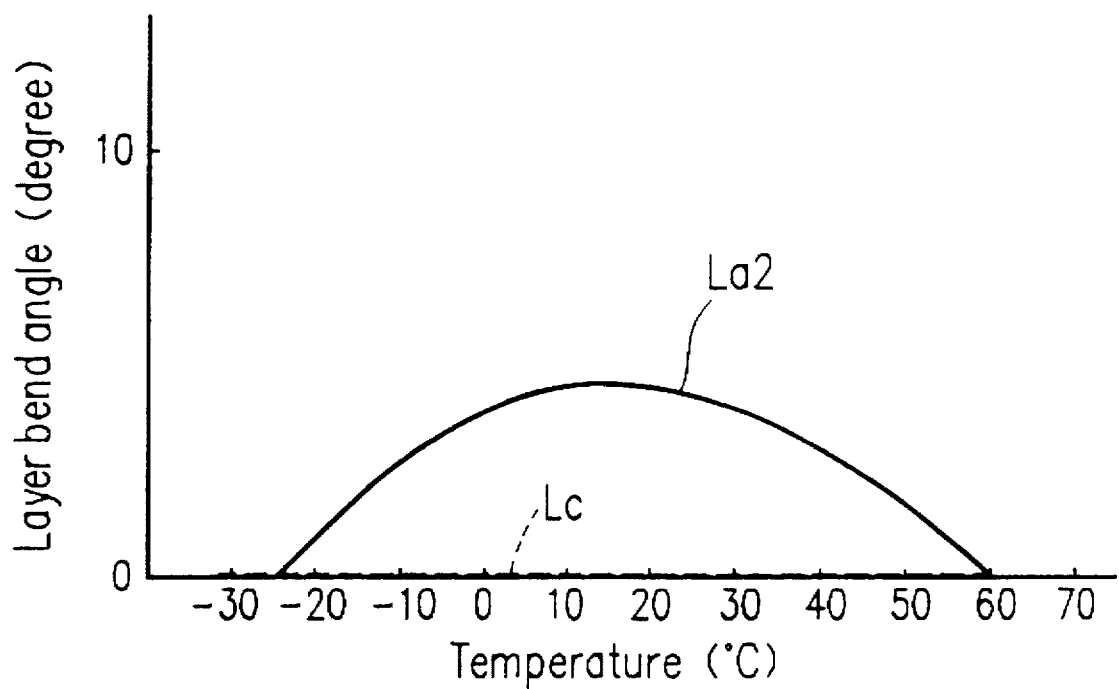
FIG. 15 is a graph showing the temperature dependence of the smectic layer bend angle of the ferroelectric liquid crystal layer in the ferroelectric liquid crystal display device of Example 2 according to the present invention.

In FIG. 15, a curve La2 represented by a solid line shows the temperature dependence of the effective layer bend angle of the ferroelectric liquid crystal layer subjected to the electric field treatment at 60° C. The layer bend angle of the ferroelectric liquid crystal layer is once increased with the decrease in temperature, reaches a local peak in the vicinity of 15° C., and is decreased. It is considered that this phenomenon is caused as follows:

The liquid crystal molecules in each smectic layer of the ferroelectric liquid crystal layer enter the adjacent layers to enlarge the effective layer thickness. In this case, the effective layer bend angle at a low temperature (almost −23° C. in the present example) becomes 0°, and contrast is decreased in accordance with a display pattern at a temperature lower than −23° C. More specifically, since the smectic layers stand up in a direction perpendicular to the substrates, the same phenomenon as the reduction in contrast occurring at higher temperatures in the conventional ferroelectric liquid crystal display device is caused at lower temperatures. However, in the present example, contrast is reduced at −23° C. or lower, and satisfactory characteristics are obtained at a storing temperature in the range of −20° C. to 60° C. As is understood from the above, as long as the effective layer bend angle is always 0° or larger at a storing temperature in the desired range, the reduction in contrast can be prevented. It is desired that the layer bend angle be 1° or larger. The fact that the effective layer bend angle is 0° or larger is equivalent to the fact that 2θ is 2θint or smaller. When the above-mentioned conditions are satisfied, the smectic layer thickness of ferroelectric liquid crystal layer becomes maximum at 60° C. in the range of =20° C. to 60° C.

Example 3

Figure 16:
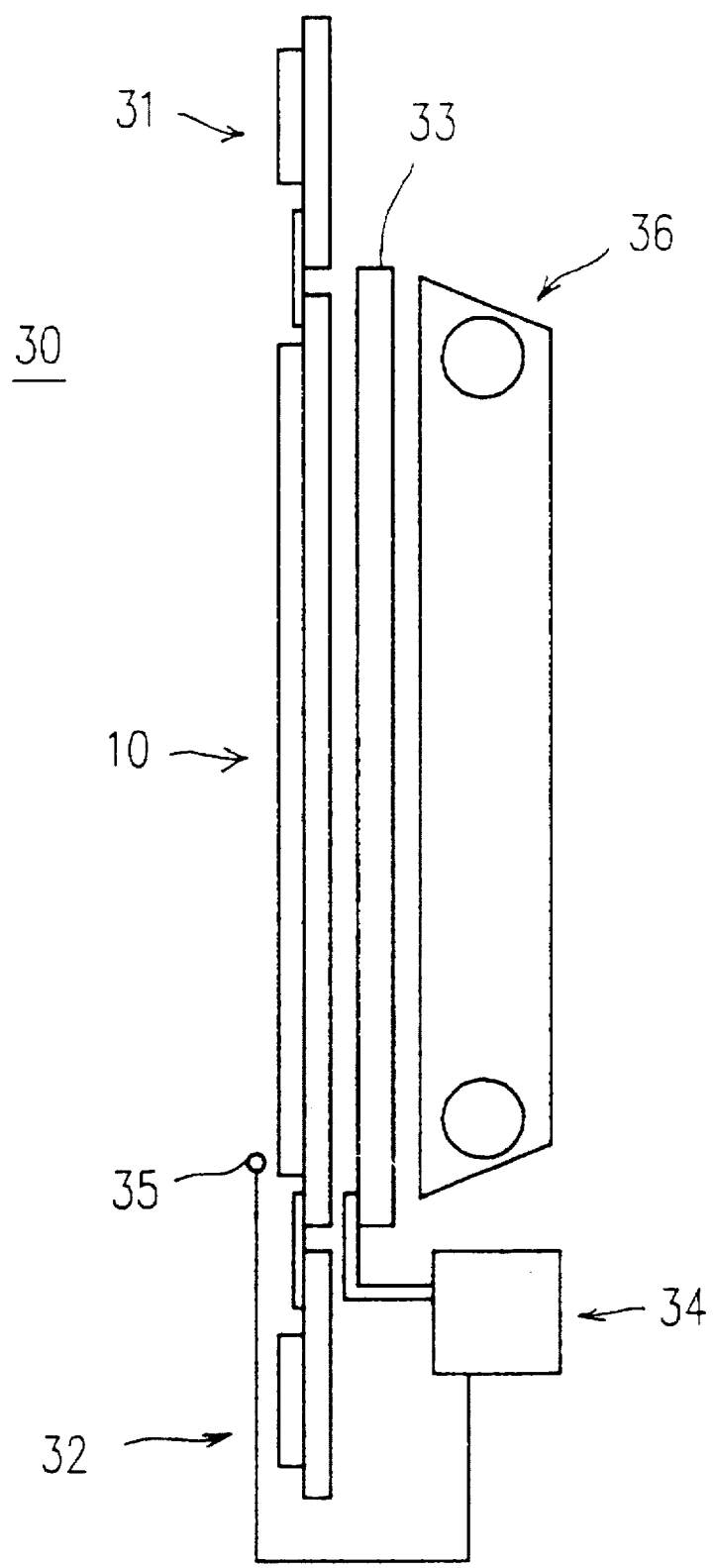
FIG. 16 is a view showing the structure of a ferroelectric liquid crystal display apparatus of Example 3 according to the present invention.

A ferroelectric liquid crystal display apparatus 30 of Example 3 according to the present invention will be described with reference to FIG. 16. The ferroelectric liquid crystal display apparatus 30 of the present example has two mechanisms: A mechanism for raising the temperature of the ferroelectric liquid crystal layer to $T_{NI}$ or higher (transition temperature from a nematic phase to an isotropic liquid phase) and a mechanism for conducting the electric field treatment to the ferroelectric liquid crystal layer at a desired temperature.

A transparent heater 33 is placed at the back of a liquid crystal display device 10. The temperature of a liquid crystal display panel is detected with a temperature sensor 35, and the detected temperature is fed back to a heater power source 34, whereby temperature control is conducted. In liquid crystal drive circuits 31 and 32, a waveform generator (not shown) for applying a low frequency AC electric field is provided.

When the temperature of the ferroelectric liquid crystal display device 10 becomes 60° C. or higher, and a region where contrast is reduced in accordance with a display pattern is formed, the display characteristics can be recovered by conducting the electric field treatment with the transparent heater 33 and the liquid crystal drive circuits 31 and 32.

If a switch (not shown) provided in the ferroelectric liquid crystal display device 10 is turned on, the drive of the ferroelectric liquid crystal display device 10 is stopped and the temperature of the ferroelectric liquid crystal display device 10 is raised to 90° C. by the transparent heater 33. At this time, the ferroelectric liquid crystal material is in an isotropic liquid phase. Thereafter, the output of the heater power source 34 is decreased to keep the ferroelectric liquid crystal display device 10 at 60° C. When the temperature of the ferroelectric liquid crystal display device 10 becomes sufficiently stable, the smectic layers of the ferroelectric liquid crystal layer stand up in a direction perpendicular to the substrates by applying a low frequency AC voltage to the ferroelectric liquid crystal layer in the ferroelectric liquid crystal display device 10.

Then, the transparent heater 33 is stopped, and the liquid crystal display device 10 is returned to room temperature, whereby contrast can be prevented from being partially decreased.

As described above, by providing the transparent heater 33 as a heating unit and means for conducting the electric field treatment to the ferroelectric liquid crystal display device 10, even in the case where contrast is reduced at a temperature of 60° C. or higher, the reduction of the display characteristics of the ferroelectric liquid crystal display device 10 can be recovered.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A ferroelectric liquid crystal display device comprising:
   a pair of substrates;
   a ferroelectric liquid crystal layer provided between the pair of substrates; and
   an electrode for applying a voltage to the ferroelectric liquid crystal layer,
   wherein the ferroelectric liquid crystal layer includes bent smectic layers, and an effective bend angle θL(T) of the bent smectic layers at a temperature (T) satisfies a relationship: θLeff(T)>θL(T)>0° at the temperature (T) in an entire temperature range in which the ferroelectric liquid crystal display device is stored, where θLeff(T) is an effective bend angle of the smectic layers in a first state at the temperature (T), the first state being obtained by cooling the ferroelectric liquid crystal layer from a temperature higher than a phase transition temperature of a chiral smectic C phase—a smectic A phase to a temperature not higher than the phase transition temperature of the chiral smectic C phase— the smectic A phase, and the temperature range is maintained lower than the phase transition temperature, and the θLeff(T) and θL(T) are functions of the temperature (T).

2. A ferroelectric liquid crystal display device according to claim 1, wherein the effective bend angle θLeff of the smectic layers in the first state is not higher than 24°.

3. A ferroelectric liquid crystal display device according to claim 1, wherein the effective bend angle θL of the smectic layers is not lower than 1°.

4. A ferroelectric liquid crystal display device according to claim 3, wherein the effective bend angle θL of the smectic layers is not higher than 15°.

5. A ferroelectric liquid crystal display device according to claim 4, wherein the ferroelectric liquid crystal layer contains a ferroelectric liquid crystal mixture having a spontaneous polarization charge in the range of 10 nC/cm² to 30 nC/cm².

6. A ferroelectric liquid crystal display device according to claim 5, wherein the ferroelectric liquid crystal layer contains a ferroelectric liquid crystal mixture having an amount of ions per unit area in the range of 20 nC/cm² to 5000 nC/cm².

7. A ferroelectric liquid crystal display device according to claim 6, wherein the ferroelectric liquid crystal layer contains a ferroelectric liquid crystal mixture having a phase sequence of a chiral smectic C phase, a smectic A phase, a chiral nematic phase, and an isotropic liquid phase in the order of increasing temperatures, wherein the ferroelectric liquid crystal mixture satisfies the relationship:

$$0.97 \leq (T_{CA}+273)/(T_{AN}+273) \leq 0.995$$

where a phase transition temperature from the chiral smectic C phase to the smectic A phase is $T_{CA}$ in centigrade, and a phase transition temperature from the smectic A phase to the chiral nematic phase is $T_{AN}$ in centigrade.

8. A ferroelectric liquid crystal display device according to claim 1, wherein an upper limit of the temperature range in which the ferroelectric liquid crystal display device is stored is not higher than 60° C.

9. A ferroelectric liquid crystal display device according to claim 1,
wherein the ferroelectric liquid crystal layer is subjected to an electric field treatment for applying a low frequency AC electric field at a temperature exceeding room temperature, and
a layer thickness of each of the smectic layers at an upper limit of a temperature range in which the ferroelectric liquid crystal display device is stored is larger than any layer thickness of the smectic layers in a temperature range in which the ferroelectric liquid crystal display device is stored.

10. A ferroelectric liquid crystal display device according to claim 9, wherein a difference between the largest layer thickness and the smallest layer thickness of the smectic layers in a temperature range in which the ferroelectric liquid crystal display device is stored is 2 Å or less.

11. A ferroelectric liquid crystal display device according to claim 1,
wherein the ferroelectric liquid crystal layer is subjected to an electric field treatment for applying a low frequency AC electric field at a temperature exceeding room temperature, and
the ferroelectric liquid crystal has two stable states in a molecular orientation direction and satisfies the following relationship:

$$2\theta int - 2\theta < 10°$$

where $2\theta$ is an angle between molecular orientation directions in the two stable states of the ferroelectric liquid crystal at room temperature, and $2\theta int$ is an angle between the molecular orientation directions in the two stable states of the ferroelectric liquid crystal immediately after being applied with a low frequency AC electric field at room temperature.

12. A ferroelectric liquid crystal display according to claim 1, wherein the temperature range is about $-20°$ C. to $60°$ C.

13. A ferroelectric liquid crystal display according to claim 1, wherein the temperature range is about $-20°$ C. to $40°$ C.

14. A ferroelectric liquid crystal display apparatus including:
a pair of substrates;
a ferroelectric liquid crystal layer provided between the pair of substrates; and
an electrode for applying a voltage to the ferroelectric liquid crystal layer, the ferroelectric liquid crystal layer including bent smectic layers, comprising:
a ferroelectric liquid crystal display device in which an effective bend angle $\theta L(T)$ of the bent smectic layers at a temperature (T) satisfies a relationship: $\theta Leff(T) > \theta L(T) > 0°$ at the temperature (T) in an entire temperature range in which the ferroelectric liquid crystal display device is stored, where $\theta Leff(T)$ is an effective bend angle of the smectic layers in a first state at the temperature (T), the first state being obtained by cooling the ferroelectric liquid crystal layer from a temperature higher than a phase transition sition temperature of a chiral smectic C phase—a smectic A phase to a temperature not higher than the phase transition temperature of the chiral smectic C phase—the smectic A phase, wherein the temperature range is maintained lower than the phase transition temperature, and the $\theta Leff(T)$ and $\theta L(T)$ are functions of the temperature (T);
heating means for heating the ferroelectric liquid crystal display device to a temperature at which the ferroelectric liquid crystal layer exhibits an isotropic phase; and
electric field treatment means for applying a low frequency AC electric field to the ferroelectric liquid crystal layer at the temperature equal to or higher than 60° C.

15. A method for producing a ferroelectric liquid crystal display device including:
a pair of substrates;
a ferroelectric liquid crystal layer provided between the pair of substrates; and
an electrode for applying a voltage to the ferroelectric liquid crystal layer, comprising the step of conducting an electric field treatment for applying a low frequency AC electric field to the ferroelectric liquid crystal layer at a temperature equal to or higher than 40° C.,
wherein the ferroelectric liquid crystal layer has bent smectic layers, and an effective bend angle $\theta L(T)$ of the bent smectic layers at a temperature (T) satisfies a relationship: $\theta Leff(T) > \theta L(T) > 0°$ at the temperature (T) in an entire temperature range in which the ferroelectric liquid crystal display device is stored, where $\theta Leff(T)$ is an effective bend angle of the smectic layers in a first state at the temperature (T), the first state being obtained by cooling the ferroelectric liquid crystal layer from a temperature higher than a phase transition temperature of a chiral smectic C phase—a smectic A phase to a temperature not higher than the phase transition temperature of the chiral smectic C phase—the smectic A phase, the temperature range is maintained lower than 40° C., and the $\theta Leff(T)$ and $\theta L(T)$ are functions of the temperature (T).

16. A method for producing a ferroelectric liquid crystal display device according to claim 15, wherein a temperature at which the electric field treatment is conducted is 60° C. or higher.

17. A method for producing a ferroelectric liquid crystal display device according to claim 15, wherein a chiral smectic C phase—smectic A phase transition temperature of a ferroelectric liquid crystal mixture contained in the ferroelectric liquid crystal layer is 5°C. higher than an upper limit of a temperature range in which the ferroelectric liquid crystal display device is stored.

18. A method for producing a ferroelectric liquid crystal display device according to claim 15, wherein the upper limit of the temperature range in which the ferroelectric liquid crystal display device is stored is at least 5° C. lower than a phase transition temperature from a chiral smectic C phase to a smectic A phase of a ferroelectric liquid crystal display mixture contained in the ferroelectric liquid crystal layer.

19. A method for producing a ferroelectric liquid crystal display device according to claim 15, wherein an electric field strength of the low frequency AC electric field used during the electric field treatment is in the range of 10 V/μm to 35 V/μm.

20. A method for producing a ferroelectric liquid crystal display device according to claim 16, wherein a frequency of the low frequency AC electric field used during the electric field treatment is in a range from 5 Hz to lower than 1 KHz.

21. A ferroelectric liquid crystal display apparatus including:

a pair of substrates;

a ferroelectric liquid crystal layer provided between the pair of substrates; and an electrode for applying a voltage to the ferroelectric liquid crystal layer, the ferroelectric liquid crystal layer including bent smectic layers, comprising:

a ferroelectric liquid crystal display device in which an effective bend angle $\theta L(T)$ of the bent smectic layers at a temperature (T) satisfies a relationship: $\theta \text{Leff}(T) > \theta L(T) > 0°$ at the temperature (T) in an entire temperature range in which the ferroelectric liquid crystal display device is stored, where $\theta \text{Leff}(T)$ is an effective bend angle of the smectic layers in a first state at the temperature (T), the first state being obtained by cooling the ferroelectric liquid crystal layer from a temperature higher than a phase transition temperature of a chiral smectic C phase—a smectic A phase to a temperature not higher than the phase transition temperature of the chiral smectic C phase—the smectic A phase, wherein the temperature range is maintained lower than the predetermined temperature, and the $\theta \text{Leff}(T)$ and $\theta L(T)$ are functions of the temperature (T);

heating means for heating the ferroelectric liquid crystal display device to a temperature at which the ferroelectric liquid crystal layer exhibits an isotropic phase; and electric field treatment means for applying a low frequency AC electric field to the ferroelectric liquid crystal layer at a predetermined temperature lower than the phase transition temperature of the chiral smectic C phase—the smectic A phase by about 520 C.

22. A ferroelectric liquid crystal display device comprising:

a pair of substrates;

a ferroelectric liquid crystal layer provided between the pair of substrates; and an electrode for applying a voltage to the ferroelectric liquid crystal layer, wherein the ferroelectric liquid crystal layer includes bent smectic layers, and a bend angle $\theta L$ of the bent smectic layers is a function of a temperature (T), expressed as $\theta L(T)$; and an effective bend angle $\theta \text{Leff}$ of the smectic layers in a first state at the temperature (T) is expressed as $\theta \text{Leff}(T)$, wherein a relationship $\theta \text{Leff}(T) > \theta L(T) > 0°$ is satisfied at a given temperature (T) in an entire temperature range in which the ferroelectric liquid crystal display device is stored, wherein the first state is obtained by cooling the ferroelectric liquid crystal layer from a temperature higher than a phase transition temperature of a chiral smectic C phase—a smectic A phase to a temperature not higher than the phase transition temperature of the chiral smectic C phase—the smectic A phase, and wherein the temperature range is maintained lower than the phase transition temperature.

* * * * *

UNITED STATES PATENT AND TRADE MARK OFFICE
CERTIFICATE OF CORRECTION

PATENT NO. : 5,781,266
DATED : July 14, 1998
INVENTOR(S) : Nakao et al.

It is certified that error appears in the above-identified patent and that said Letters Patent is hereby corrected as shown below:

On the title Page, the Abstract should read:

> A ferroelectric liquid crystal display device includes: a pair of substrates; a ferroelectric liquid crystal layer provided between the pair of substrates and an electrode for applying a voltage to the ferroelectric liquid crystal layer. The ferroelectric liquid crystal layer has bent smectic layers, and the effective bend angle θL of the bent smectic layers satisfies the relationship: θLeff > θL > 0°, in a temperature range in which the ferroelectric liquid crystal display device is stored. θLeff indicates the effective bend angle of the smectic layers in a first state. The first state is obtained by cooling the ferroelectric liquid crystal layer from a temperature higher than $T_{CA}$ to a temperature not higher than $T_{CA}$, where $T_{CA}$ indicates the phase transition temperature of a chiral smectic C phase to a smectic A phase.

UNITED STATES PATENT AND TRADE MARK OFFICE
CERTIFICATE OF CORRECTION

PATENT NO. : 5,781,266
DATED : July 14, 1998
INVENTOR(S) : Nakao et al.

It is certified that error appears in the above-identified patent and that said Letters Patent is hereby corrected as shown below:

At column 20, line 39, "θLeff" should read --θLeff(T)--.

At column 20, line 40, after "24°" insert --in the temperature range--.

At column 20, line 42, "θL" should read --θL(T)--.

At column 20, line 43, after "1°" insert --in the temperature range--.

At column 20, line 45, "θL" should read --θL(T)--.

At column 20, line 46, after "15°" insert --in the temperature range--.

At column 24, line 5, delete "520" and insert --5°--.

Signed and Sealed this

First Day of December, 1998

Attest:

BRUCE LEHMAN

*Attesting Officer*   *Commissioner of Patents and Trademarks*